(12) United States Patent
Pienkos

(10) Patent No.: US 8,700,476 B1
(45) Date of Patent: Apr. 15, 2014

(54) METHOD AND SYSTEM FOR FACILITATING THE TRANSFER OF INTELLECTUAL PROPERTY

(75) Inventor: John Thaddeus Pienkos, Milwaukee, WI (US)

(73) Assignee: Patent Cloud LLC, Wilmington, DE (US)

( * ) Notice: Subject to any disclaimer, the term of this patent is extended or adjusted under 35 U.S.C. 154(b) by 848 days.

(21) Appl. No.: 12/319,366

(22) Filed: Jan. 6, 2009

Related U.S. Application Data

(60) Division of application No. 11/702,763, filed on Feb. 5, 2007, which is a continuation of application No. 09/724,744, filed on Nov. 28, 2000, now Pat. No. 7,272,572.

(60) Provisional application No. 60/190,770, filed on Mar. 20, 2000.

(51) Int. Cl.
G06Q 30/00 (2012.01)

(52) U.S. Cl.
USPC ........................................ 705/26.1; 705/27.1

(58) Field of Classification Search
USPC .................................. 705/26, 27, 26.1, 27.1
See application file for complete search history.

(56) References Cited

U.S. PATENT DOCUMENTS

| | | | |
|---|---|---|---|
| 4,302,810 A | 11/1981 | Bouricius et al. | |
| 5,892,900 A | 4/1999 | Ginter et al. | |
| 5,950,175 A | 9/1999 | Austin | |
| 5,970,479 A | 10/1999 | Shepherd | |
| 6,018,714 A | 1/2000 | Risen, Jr. et al. | |
| 6,073,124 A | 6/2000 | Krishnan et al. | |
| 6,134,536 A | 10/2000 | Shepherd | |
| 6,175,824 B1 | 1/2001 | Breitzman et al. | |
| 6,324,525 B1 | 11/2001 | Kramer et al. | |

(Continued)

FOREIGN PATENT DOCUMENTS

| | | |
|---|---|---|
| JP | 02000268111 A | 9/2000 |
| JP | 02002083124 A | 3/2002 |
| WO | 0028452 A1 | 5/2000 |
| WO | 01/93154 A2 | 12/2001 |

OTHER PUBLICATIONS

Child, Jeff, An Internet "exchange" aims to revolutionize trading in intellectual property patents. Electronic Design47.6 (Mar. 22, 1999): 31. Downloaded from ProQuest Direct on the internet on Nov. 18, 2013, 2 pages.*

(Continued)

*Primary Examiner* — James Zurita
(74) *Attorney, Agent, or Firm* — Lerner, David, Littenberg, Krumholz & Mentlik, LLP

(57) ABSTRACT

A method and system for facilitating the transfer of intellectual property are disclosed. In one embodiment, the method of facilitating the transfer of intellectual property includes obtaining at a computer system of a first entity information concerning intellectual property in which an interest is available for transfer (the "available intellectual property") from a second entity. The method further includes transferring the interest in the available intellectual property by concluding an agreement between the first and second entities. The agreement is representative of an acceptance of an offer concerning the transferring of the interest in the available intellectual property and consideration for the transferring of the interest. At least a portion of the interest in the available intellectual property that is transferred to the first entity is intended to be transferred from the first entity to a third entity.

28 Claims, 10 Drawing Sheets

(56) References Cited

U.S. PATENT DOCUMENTS

| | | | |
|---|---|---|---|
| 6,330,547 | B1 | 12/2001 | Martin |
| 6,360,210 | B1 * | 3/2002 | Wallman .................... 705/36 R |
| 6,449,645 | B1 | 9/2002 | Nash |
| 6,578,016 | B1 * | 6/2003 | Trankina et al. ................ 705/39 |
| 6,615,187 | B1 | 9/2003 | Ashenmil et al. |
| 6,625,581 | B1 | 9/2003 | Perkowski |
| 6,684,196 | B1 | 1/2004 | Mini et al. |
| 6,959,280 | B1 | 10/2005 | Risen, Jr. et al. |
| 7,272,572 | B1 | 9/2007 | Pienkos |
| 8,150,757 | B1 * | 4/2012 | Sieffert et al. .................. 705/37 |
| 2002/0002523 | A1 | 1/2002 | Kossovsky et al. |
| 2002/0002524 | A1 | 1/2002 | Kossovsky et al. |
| 2002/0004775 | A1 | 1/2002 | Kossovsky et al. |
| 2002/0029183 | A1 | 3/2002 | Vlahoplus et al. |
| 2002/0069079 | A1 | 6/2002 | Vega |
| 2002/0103654 | A1 | 8/2002 | Poltorak |
| 2003/0105831 | A1 | 6/2003 | O'Kane |
| 2006/0259315 | A1 | 11/2006 | Malackowski et al. |

OTHER PUBLICATIONS

Information concerning Technology Innovations, LLC, printed on Jul. 26, 2002, obtained at www.tillc.com (10 pages).

Jacobs, Paul, Selling Patents Online; Internet: A Growing number of start-ups are creating Web sites for the sale of intellectual property rights.; [Home Edition]. Los Angeles, Calif.: Oct. 25, 1999. p. 1, download from ProQuest Direct on the Internet on Aug. 14, 2011, 6 pages.

Justice Department Approves Proposal for Joint Licensing of Patents Essential for Meeting Video Technology Standard Used in Electronics and Broadcast Industries, www.usdoj.gov/atr/public/press.sub.--releases/1997/1173.htm, 2 pages.

Letter dated Aug. 31, 2006 from Inventors' Publishing & Research and attached article republished from Forbes.com entitiled "Inventors' Publishing & Research Achievers rare. Invention Licensing 'Hat Trick'", originally published on Jul. 10, 2006.

Letter From Joseph Lee Re Patent Services, Acacia Technologies Group, Nov. 17, 2006, 2 pages.

Letter/Opinion of Department of Justice Antitrust Division concerning MPEG LA, Joel I. Klein, Acting Assistant Attorney General, dated Jun. 26, 1997, 15 page printout obtained at www.usdoj.gov.

Malik, Om, Technology's clearinghouse: Yet2.com, Forbes, Feb. 7, 2000, downloaded from the Internet on Aug. 14, 2011, 2 pages.

Margaret Quan, Intellectual Property Exchange takes off, EE Times, Mar. 10, 2000.

Newu Palomeras et al., Waking up sleeping markets for technology transfer, Job Market Paper, Aug. 2003.

Pages from website of 2XFR Intellectual Property Licensing and Tech-XFR Marketplace, obtained at www2xfr.com, printed on May 24, 2003, 28 pages.

Pages from website of divine Company, obtained at www.divine.com (specifically www2.divine.com and zdnet.com.com), printed on Nov. 16, 2002, 11 pages.

Pages from website of Fairfield Resources International, Inc., obtained at www.frlicense.com, printed on May 6, 2003, 13 pages Pages from website of Miramonte Technologies, obtained at www.miramontetechnologies.com, printed on Nov. 16, 2002, 6 pages Press Releases of Swiss Re & Ernst & Young, Apr. 22, 1999 & Sep. 8, 1999, 4 pages.

Printout of web pages of website of maxiam LLC, obtained at www.maxiam.com, printed on Sep. 30, 2003, 15 pages.

Rembrandts in the Attic—Unlocking the Hidden Value of Patents, printout of biographical information, obtained at www. pickabook.co.uk, printed May 22, 2006, book published on Jan. 31, 2000 according to available biographical information.

Rivette et al., Discovering New Value in Intellectual Property. By: Rivette, Kevin G., Kline, David, Harvard Business Review, 00178012, Jan./Feb. 2000, vol. 78, Issue 1, downloaded from the Internet on Aug. 14, 2011, 14 pages.

Schechter et al., Buying and Selling Intellectual Property: Why, What & How, Peter C. Schechter, Allison Singh. Computer and Internet Lawyer. Frederick: Sep. 2010. vol. 27, Iss. 9; p. 18, downloaded from ProQuest Direct on the Internet on Aug. 14, 2011, 12 pages.

Site listings from Yahoo! commercial directory concerning patent services, obtained at dir.yahoo.com, printed Jun. 29, 2002, 3 pages.

Unknown, Ernst & Young' investment in Patent & License Exchange, Inc. pl-x.com—give firm stake in future e-business leade Business Wire, Sep. 8, 1999.

Unknown, Patent market-maker pl-x.com announces strategic partnership with Ernst & Young LLP, Business Wire, Sep. 8, 1999.

Unknown, Swiss redevelops patent validity insurance for the Patent & License Exchange, Business Wire, Apr. 22, 1999.

Unknown, The new anaconda company announces the bid to acquire 100% intellectual property rights, PR Newswire Aug. 17, 1999.

Web page of MicroPatent, found at www.micropat.com/, dated Jul. 25, 2001.

Web page of PATEX, found at www.patex.com, dated Jul. 25, 2001.

Web pages From Wikipedia Concerning "Software Patent Debate", Obtained at en.wikipedia.org, Printed on Jan. 10, 2007, 10 pages.

Web Pages of Acacia Research Corp., Obtained at www.acaciaresearch.com, Printed on Jan. 4, 2007, 28 pages.

Web pages of Altitude Capital Partners, obtained at www.altitudecp.com/value.html, printed on Dec. 15, 2006, 5 pages.

Web pages of BTG plc., found at www.btgplc.com, dated Apr. 17, 2001.

Web pages of CATI (Center for Advanced Technology and Innovation), Obtained at www.thecati.com, Printed on Jan. 4, 2007, 8 pages.

Web pages of Ernst & Young, found at www.ey.com, dated Sep. 12. 2001.

Web pages of FindLaw, found at techdeals.biz.findlaw.com, dated Sep. 13, 2001; Patent License Agreement (exemplary).

Web pages of Inflexion Point Strategy, obtained at www.ip-strategy.com/services.html, printed on Dec. 15, 2006, 4 pages.

Web pages of Information Holdings Inc., found at www.corporateintelligence.com, dated Jul. 25, 2001.

Web pages of Inte Cap, Inc., found at www.intecap.com, dated Sep. 12, 2001.

Web pages of LPS Group, found at www.informationholdings.com/Ips/, dated Jul. 25, 2001.

Web pages of mycounsel.com, found at www.mycounsel.com, dated Sep. 13, 2001, "Requirements and Considerations When Licensing Your Patent".

Web pages of Patent Bank, found at www.patentbank.co.kr, dated Jul. 25, 2001.

Web pages of Patent Data Systems Ltd., found at www.patentdata.com, dated Nov. 1, 2001.

Web pages of Patent Imaging Corporation, found at www.patentimaging.com, dated Nov. 2, 2001.

Web pages of QED Intellectual Property, Ltd., found at www.qed-ip.com, dated Jan. 26, 2001.

Web pages of Woodbridge & Associates, P.Co, found at www.njiplaw.com, dated Sep. 13, 2001, "Basic Terms and Conditions of a Strong Patent License".

Web pages of www.lawsmart.com, dated Sep. 13, 2001, "Exclusive Patent License Agreement".

An Internet "exchange" aims to revolutionize trading in intellectual property patents, Child, Jeff. Electronic Design 47.6 (Mar. 22, 1999); 31. Downloaded from ProQuestDirect on the Internet on Mar. 21, 2013, 2 pages.

The Cutting Edge: Focus on Technology; Marketplace of Ideas: Selling Patents Online; Internet: A Growing Number of Start-Ups are Creating Web Sites for the Sale of Intellectual Property Rights. [Home Edition], Jacobs, Paul. Los Angeles Times [Los Angeles, Calif] Oct. 25, 1999:1. Downloaded from ProQuestDirect on the Internet on May 13, 2013, 4 pages.

"An Internet 'Exchange' Aims to Revolutionize Trading in Intellectual Property Patents", Penton Media, Mar. 22, 1999, 2 pages.

"Are Patents Next for the Online Auction Block?" The Recorder, May 20, 1999, 1 page.

"Automatic Patent Validity Insurance", North American Specialty Insurance Co., 1999, 1 page.

(56) References Cited

OTHER PUBLICATIONS

"Brief of Altitude Capital Partners, Expanse Networks, Inc., Inflexion Point Strategy, LLC, Interdigital Communications Corp., IPotential, LLC, Ocean Tomo, LLC and OnSpec Electronic Inc. as Amici Curiae in support of respondents" Oct. 2006, coversheet on pp. 1-4.
"Companies Cash in on 'Discovered' Patents",. Technology Business, Nov./Dec. 1997 (author Nancy Croft Baker), reprinted by Alliance Technology Services, Inc.
"Creating an efficient technology market", Kossovsky et al., Chemtech, Dec. 1998, 3 pages.
"From Labs to Riches", Peter J. Cronk, The Legal Intelligencer, Mar. 24, 1997.
"GE Real Estate Creates Strategic Capital Group", Dec. 17, 2003, concerning GE Strategic Capital Group, 4 pages.
"Getting More Revenue for Your Clients From Their Intellectual Property", Presentation by Ted Klumb, Alliance Technology Service, Inc., 1998-1999, including article "One Man Band", The Business Journal, Jun. 19, 1998.
"House Rules" of the Patent & License Exchange, Aug. 25, 2000, 4 pages.
"Intel Hit With $833 Million Patent Lawsuit," by Alexander Wolfe, EE times, obtained at www.itnews.com.au, printed Jun. 29, 2002, 3 pages.
"IV moves from myth to reality", Intellectual Asset Management Magazine, Aug./Sep. 2006, Issue 19, pp. 29-34 plus cover sheet.
"Japan Wants to 'Wake Up ' Unused Patents", found at www.wired.com, dated Sep. 13, 2001, (author Gene Koprowski, article date Mar. 12, 1997).
"Patent Fight Pending," originally published by SF Weekly on Dec. 6, 2000, by Bernice Young, obtained at www.sfweekly.com, printed on Jun. 29, 2002, 4 pages.
"Patent Wars", The Economist, Apr. 6, 2000, 5 pages as printed.
"PLX Announces Plans to Revolutionize $3.5 Billion Patent Industry Through Global, Internet-Based Patent Auction Market", press release dated Jan. 22, 1999, obtained at <http://www.eurekalert.org/pub-releases/1999-01/F1-PAPT-220199.php, printedon Mar. 6, 2004, 2 pages.
"U.S. Companies Ignore More Than $115 Billion in Technology Assets, Survey Finds", press release by BTG, Jun. 22, 1998. reprinted by Alliance Technology Service, Inc.
"Using the Internet for Technology Transfer and Licensing", conference sponsored by Licensing Executives Society, Crystal City, VA, Apr. 15-16, 1996.
"Would You Buy a Patent License From This Man," by Ian Mount, obtained at www.business2.com, printed Jun. 29, 2002, 4 pages.
Acacia documents, 46 pages, downloaded from the Internet on 4 and 10 Jan. 2007.
Additional copies of web pages of LPS Group, found at www.informationholdings.com, dated Sep. 13, 2001, "Markets Trends".
Additional information concerning Technology Innovations LLC, printed on Jul. 26, 2002, obtained at yahoo.com (2 pages).
Addtional copies of web pages of Patent Cafe Magazing/Patent Cafe, found at www.cafezine.com, dated Sep. 13, 2001, "How to Determine Royalty Rates".
Allen, Linn, Technology and the rising tide of real estate brokers; [Fifth Edition],San Francisco Examiner. San Francisco, Calif.:Aug. 20, 1995. p. E.6, downloaded from ProQuestDirect on the Internet on May 9, 2012, 4 pages.
Article "Mine Games" by Eric W. Pfeiffer, dated Jun. 24, 2002, obtained at www.forbes.com/asap, printed Jun. 22, 2002, 3 pages.
Atnewyork Staff, Online Intellectual Property Exchange buys software firm, from http://www.atnewyork.com/news/article.php/340501.
Brunswold, Brian et al., Drafting Patent License Agreements, 4th ed. (1998), exemplary sections including Table of Contents (pp. v-xi), Chapters 1-3 (pp. 1-40), and Chapter 10 (pp. 91-116).
Carlson, Patent pools and the antitrust dilemma, Yale Journal on Regulation. New Haven: summer 1999. vol. 16, Iss. 2; p. 359, 47 pgs.
Company Press Release, pl-x.com, Sep. 23, 1999, 2 pages.
Corporate information regarding Catch Curve, Inc., obtained at www.catchcurve.com, printed on May 22, 2006.
Documentation of The Patent & License Exchange, 1999, 31 pages, including "The Patent & License Exchange FAQ Sheet", "PL-X.com Subscriber Qualifications", "PL-X.com Subscriber Fees and Seller's Commissions", "PLX Subscriber Application Form", & PL-XInformational Brochure.
From http://web.archive.org/, Internet Wayback Machine for http://pl-x.com.
From http://www.pl-x.com, PLX Systems Products & Services.
From http://www.yet2.com, yet2.com's mission is to help you identify and capture the full value of your IP assets.
Harvard Business School Case Draft N9-600-150, "The Patent & License Exchange: Enabling a Global IP Marketplace", dated Jul. 1, 2000.
Home page and additional web pages concerning TechSearch LLC, obtained at www.techsearch-llc.com, printed Jun. 29, 2002, 12 pages.
Home page and additional web pages of IPnetwork.com, found at www.ipnetwork.com, dated Jan. 19, 2001.
Home page and additional web pages, and involving press releases, concerning ipValue Management Inc., obtained at www.ipvalue.com, printed Jun. 21, 2002, 32 pages.
Home page of DaVinci-Online, found at www.davinci-online.com, dated Dec. 26, 2000.
Home page of Intellectual Property Technology Exchange, found at www.techex.com, dated Feb. 19, 2001.
Home page of INTX, found at www.intxweb.com, dated Feb. 19, 2001.
Home page of Tech Exchange Online, found at www.teonline.com, dated Jan. 12, 2001.
Home page of the Delphion Intellectual Property Networks (Formerly the IBM Intellectual Property Network), found at www.delphion.com, date Dec. 26, 2000.
Home page of the Hook Appropriate Technology found at www.thehooktek.com, dated Dec. 26, 2000.
Home page of the Intellectual Property Exchange, found at www.ipex.net, dated Feb. 19, 2001.
Home page of the Patent & License Exchange, Inc., found at www.pl-x.com, dated Dec. 26, 2000.
Home page of the Patent Cafe, found at www.patentcafe.com, dated Dec. 26, 2000.
Home page of the U.S. Patent and Trademark Office, found at www.uspto.gov, dated Dec. 26, 2000.
Home page of TTG/Newfuntiers, found at www.newfuntiers.com dated Dec. 29, 2000.
Home page of yet2.com, found at www.yet2.com, dated Dec. 26, 2000.

\* cited by examiner

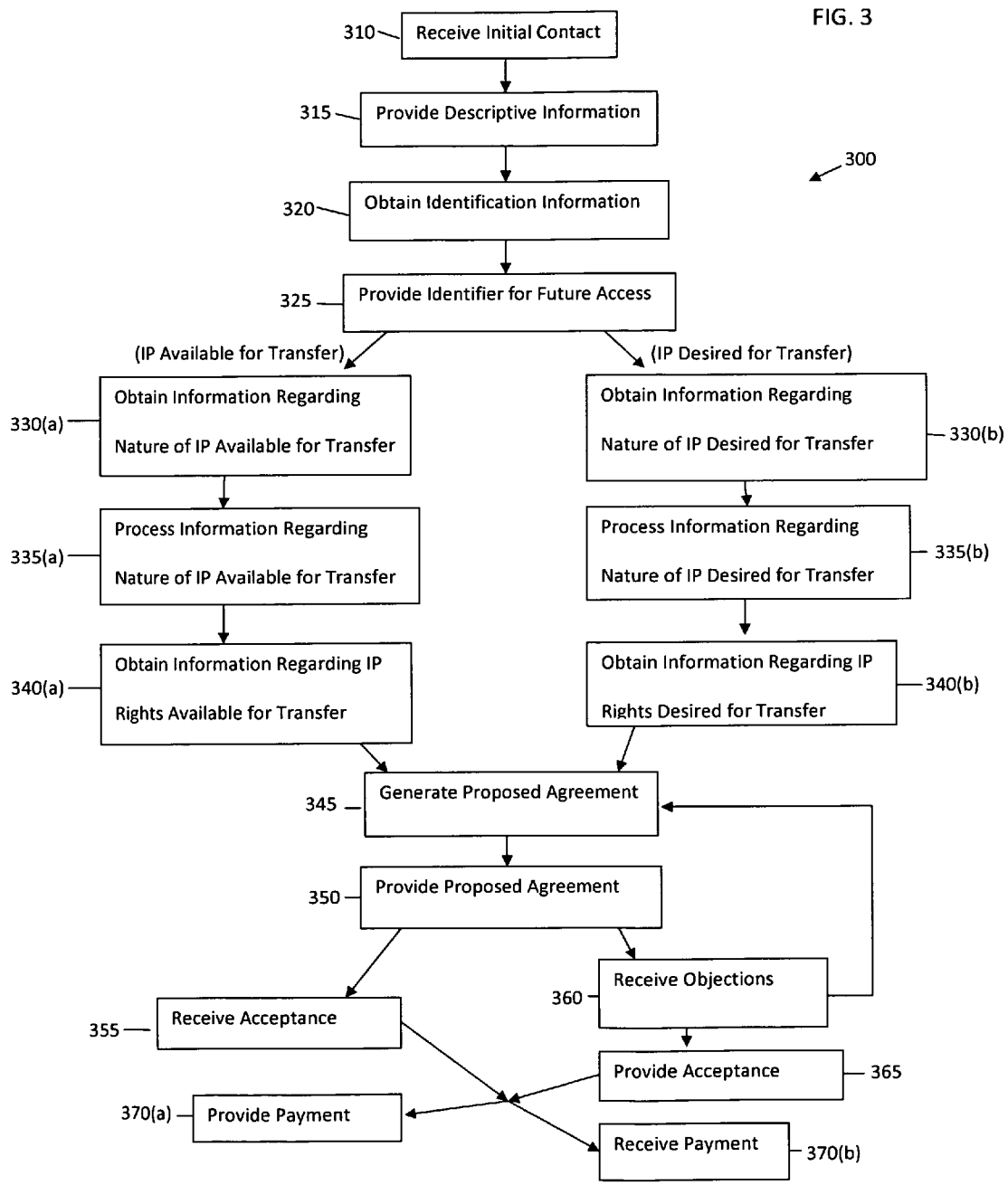

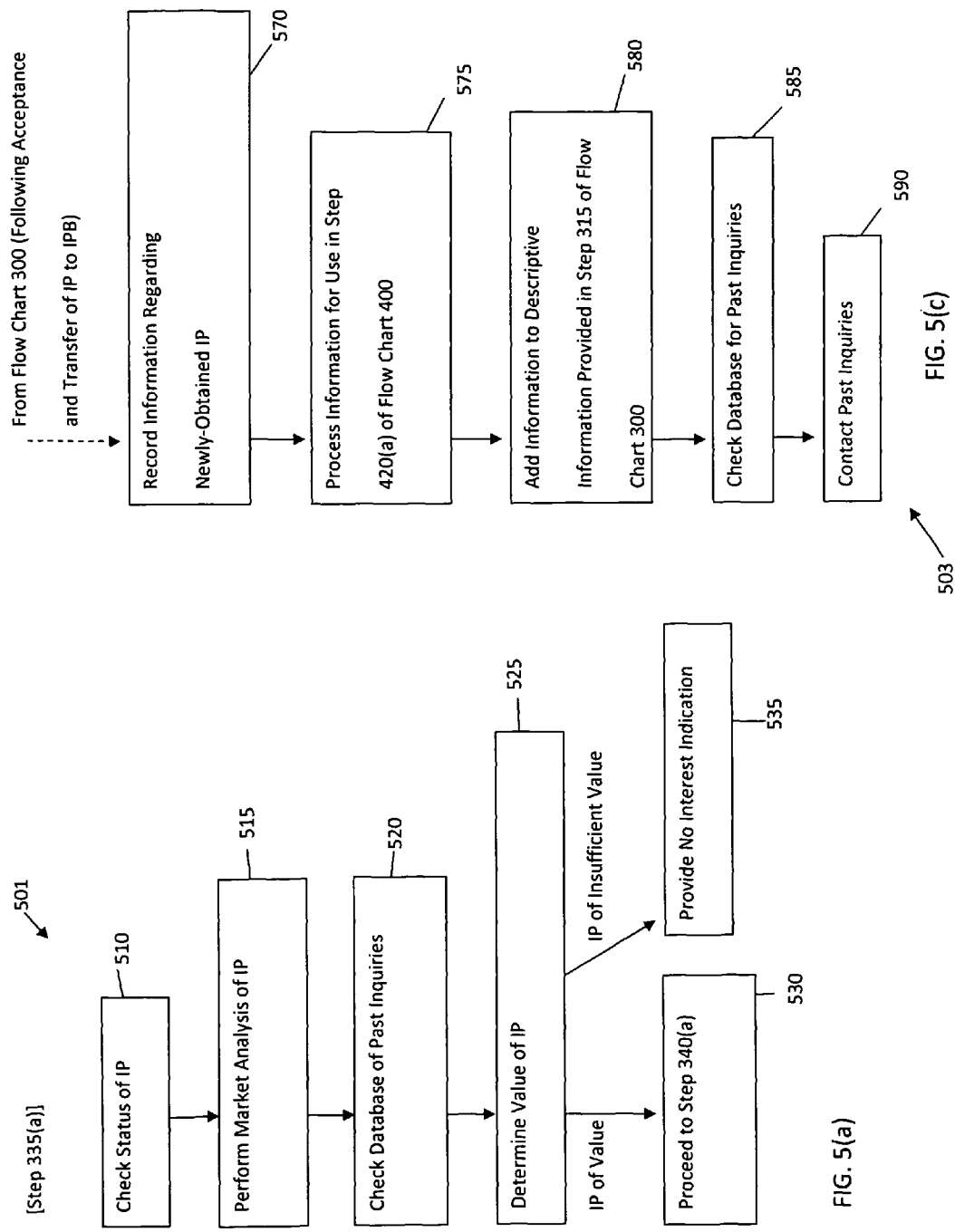

Welcome to

‑ ‑ ‑ ‑ ‑ ‑ ‑ ‑

NEW USER ☐

EXISTING USER LOGIN
USERNAME [ ]
PASSWORD [ ]

*Fig. 6(a)*

Identification Information

Name/Company Name [ ]
Address [ ]
Email Address [ ]
Telephone # [ ]
Facsimile # [ ]

IP Desirer ☐
IP Owner ☐

Submit ☐

*Fig. 6(b)*

Patents Available for Transfer

622 → Patent Number ▢  626 → Existing Information
   → Issue Date ▢         Remains Accurate ☐
   → Inventor ▢

624 → Technology Area ▢

Product Area ▢

Market Description ▢   Submit ☐ ← 628

Patents Rights for Transfer  630

632 → License ☐         Sale ☐
   Exclusive ☐       Desired Sale Price ▢
   Non-Exclusive ☐
   Expiration Date ▢
   Claim Limitations ▢          Submit ☐ ← 634
   Desired Royalty Rate ▢
   Territorial Restrictions ▢
   Sublicensing Restrictions ▢
   Usage/Product/Market Restrictions ▢

*Fig. 6(d)*

METHOD AND SYSTEM FOR FACILITATING THE TRANSFER OF INTELLECTUAL PROPERTY

CROSS-REFERENCE TO RELATED APPLICATIONS

This application is a divisional of U.S. patent application Ser. No. 11/702,763 filed on Feb. 5, 2007 and entitled "METHOD AND SYSTEM FOR FACILITATING THE TRANSFER OF INTELLECTUAL PROPERTY", which is a continuation of U.S. patent application Ser. No. 09/724,744 filed on Nov. 28, 2000 now U.S. Pat. No. 7,272,572 having the same title, which in turn is based upon U.S. provisional patent application 60/190,770 entitled "APPARATUS AND METHOD FOR FACILITATING TECHNOLOGY TRANSFER" filed on Mar. 20, 2000, claims the benefit of each of those applications, and hereby incorporates by reference herein each of those patent applications.

FIELD OF THE INVENTION

The present invention relates to a method and system for facilitating the transfer of intellectual property. In one aspect, the present invention relates to an electronic, computer-based system for facilitating the licensing and sale of patent and other intellectual property assets from the original owners of those assets to an intellectual property investment bank (IPIB), and for facilitating the licensing (including sublicensing) and resale of such transferred intellectual property assets from the IPIB to third parties desirous of acquiring such assets, both by way of and independent of intellectual property asset exchange institutions.

BACKGROUND OF THE INVENTION

Intellectual property assets, including patents, trademarks, copyrights, trade secrets, and a variety of other assets, are among the most important assets of businesses. Recently, intellectual property assets have grown in importance relative to other assets of businesses such as plant and equipment, access to natural resources, or capital. These other assets have become increasingly fungible and commoditized due to globalization and modernization of the world economy. In contrast, due to the increasing speed of technological change in the economy, particularly technological change arising from the widespread use of computers and new telecommunications technologies including the interne, patents have especially increased in their importance to companies. By providing a patentee with an ability to preclude other parties from making, using or selling a particular technology, for a limited time, a patent can provide the patentee with a very secure and valuable competitive advantage.

While patents can be of great value, only relatively few patents are effectively exploited by the patentees (or the assignees of the patents) so that the patents actually achieve their maximum value as assets. Many patents are held by companies that do not make, use or sell products (or services) embodying the technologies claimed in the patents. Further, relatively few patents are diligently enforced against other companies or licensed in the most profitable fashion possible, to all of or even a few of the companies (or other parties) who would be interested in licensing those patents and willing to pay for such licenses. Additionally, very few companies seriously investigate the possibility of selling their patents.

There are several reasons for the failure of patent-holders to maximize the value of their patents through licensing or sale. Some patents are held by companies which for business reasons have chosen not to make, use or sell technologies covered by the patents, even though there is a market for such technologies that other companies would be interested in exploiting if they were able to license or purchase those same patents. More commonly, many patent holders fail to realize, due to bad judgment or ignorance (or simply due to the complexity and uncertainties that exist in the financial valuation of patents), the potential value of their patents. For example, many patents that in fact cover a variety of technologies in a variety of industries are held by companies, or only licensed to companies, which make, use or sell products embodying only a small subset of those technologies within only a subset of those industries. Typically, such patent-holders are not aware of all of the potential applications of their patented technologies.

Insofar as patents are of great and increasing value, and insofar as patents have historically been underexploited as assets particularly due to companies' inadequate understanding of their patents as well as other inefficiencies in the licensing or sale (or other transfer) of patents, there is a growing need for mechanisms and institutions that facilitate the licensing and sale of patents. Recently, various groups have begun to recognize this need and have begun to respond to it. In particular, several groups have begun to develop patent or intellectual property asset exchanges, which include (for example) The Patent and License Exchange, PatentCafe.com and yet2.com. The development of such exchanges has been facilitated by the development of computers and telecommunications technologies generally, and the internet specifically. These exchanges provide markets or forums in which individuals owning intellectual property assets can place those assets up for licensing or sale. Others interested in licensing or purchasing intellectual property assets can then obtain information regarding, and eventually license or purchase, the intellectual property assets that are available for transfer. Such exchanges are somewhat analogous to stock markets, which provide forums in which companies with securities may be linked with individuals who desire to purchase securities.

In addition to the groups developing such intellectual property asset exchanges, various law firms (particularly patent boutiques or general practice firms with patent or intellectual property departments) and accounting firms have begun to develop intellectual property asset management programs, which monitor clients' patents (and other intellectual property assets) and provide services designed to leverage clients' intellectual property portfolios. In providing these services, law firms and accounting firms have attempted to build upon their traditional expertises in preparing, prosecuting and defending intellectual property assets, accounting for intellectual property assets, and providing assistance in negotiating and developing contracts regarding the license or transfer of intellectual property assets. Among the services provided in intellectual property asset management programs are counseling-type services designed to help clients determine which intellectual property assets are worth developing and protecting including auditing-type services to help clients determine what intellectual property assets they actually own.

In addition, some of the law firms and accounting firms have begun to provide (or begun to work with partners who can provide) financial or strategic management expertise rather than strictly legal or accounting expertise. By providing such expertise, the law firms and accounting firms hope to provide clients with further counseling as to how they may develop intellectual property assets that will be of value given present and future market needs. Such counseling may include advice to license, sell, or purchase patents. Indeed, one important service some of these firms are offering is assistance in "mining" the patents and other intellectual property assets the clients already own by reexamining the assets and attempting to find new markets (or markets otherwise unknown to the clients) in which those assets may be exploited. Such "mining" may include the finding of new potential licensees or purchasers of the client's intellectual property assets.

In addition to the groups developing intellectual property asset exchanges and intellectual property asset management programs, some groups are developing intellectual property brokerages. The development of such brokerages, like the intellectual property asset exchanges, has been facilitated by the emergence of the interne. Some of these brokerages, such as DaVinci-Online™ and TTG/Newfuntiers focus primarily on acting as brokerages uniting individual inventors (who have ideas or, in relatively limited cases, actual patent rights) with persons who may desire to implement, purchase or license those ideas. Other brokerages, such as The Hook focus on acting as brokerages uniting companies with potential markets. The brokerages provide services including market analysis services (to determine the potential marketability of a client's ideas or patents), marketing services (including on-line display of information regarding clients' technologies), and searching for potential development partners and purchasers/licensees. The brokerages each operate by receiving up-front fees and/or commissions for the services they provide. The brokerages less frequently take equity interests in their clients, since the taking of such equity interests is a less reliable arrangement for earning income.

Although intellectual property asset exchanges, law firms and accounting firms with intellectual property asset management programs, and intellectual property brokerages are beginning to provide valuable services, each of these types of institutions has significant limitations in facilitating the licensing or sale of patents. With respect to intellectual property asset exchanges, such institutions are only in the beginning stages of their development into mature, efficient forums for the trading (licensing, selling and purchasing) of intellectual property assets. It remains to be seen whether such forums can radically or only partially streamline the process of putting together licensors and licensees, and buyers and sellers, of intellectual property assets, by reducing information barriers and various other risks.

Further, regardless of whether intellectual property asset exchanges are successful in providing more efficient forums in which to trade intellectual property assets, the effectiveness of such exchanges will always depend in large part upon the skills of those individuals who interact with the exchanges (e.g., the parties holding "seats" on the exchanges). Such persons will need skills in effectively placing information onto, obtaining information from, and interpreting information obtained from the exchanges. Further, such persons will require decision-making skills concerning trading on the exchanges, e.g., skills in determining when it is appropriate to in fact proceed with trades on the exchanges. Although some large corporations (e.g., IBM) may have sufficient resources and incentive to develop the expertise necessary to operate in conjunction with the exchanges, without intermediaries, most small and mid-size corporations will require considerable assistance to operate in conjunction with the exchanges.

Law firms and accounting firms also are constrained to a significant extent from effectively facilitating the licensing and sale of patents. Law firms and accounting firms are restricted by laws that preclude non-lawyers from entering into partnerships with lawyers. Such laws tend to limit law firms' ability to hire persons with non-legal (e.g., accounting, financial, or managerial) expertise, and to limit accounting firms' ability to hire persons with traditionally legal expertise (e.g., expertise in obtaining patent rights, enforcing those rights, and developing contracts regarding those rights), although some accounting firms have been attempting to overcome these limitations by offering lawyers very high compensation. In addition, at least law firms tend to be conservative in attempting to develop new service capabilities that are not strictly legal in nature. The organizational structure of law firms (a rigid partner-associate model) tends to preclude the hiring of persons who are not lawyers. Consequently, in developing their intellectual property asset management programs, law firms have been attempting to fit lawyers into non-legal roles or, alternatively, to form partnerships with outside, non-legal institutions. Both of these ways of developing non-legal expertise have significant inefficiencies.

As regulated, service-oriented firms, both law firms and accounting firms face additional constraints that limit their abilities to effectively facilitate the licensing and selling of patents. Neither law firms nor accounting firms are comfortable with marketing their clients' products or services, which may include licensable or saleable intellectual property assets. Nor are law firms or accounting firms generally comfortable with the prospect of taking a financial interest in their clients or clients' assets. Both types of firms are risk averse. Further, at least law firms face legal rules that preclude (or at least cloud) their ability to take an interest in their clients. Because law firms and accounting firms typically must therefore be compensated on a per-job basis or on an hourly basis (rather than in equity or by sharing in a clients' profits), these firms have only a moderate incentive to assist their clients in achieving greater profits by more effectively exploiting their patents.

Additionally, both law firms and accounting firms are somewhat, if not completely, limited in representing clients whose interests conflict. As a result, there are significant barriers to the growth of law firms and accounting films in their efforts to facilitate the transfer of intellectual property to and from many different clients. Indeed, law firms and accounting firms are to a significant extent precluded from assisting in deal-making between parties who may be interested in exchanging patent rights simply because the firms are uncomfortable with (or incapable of) representing (or mediating between) parties on opposite sides of a negotiating table.

These limitations on the abilities of law firms and accounting firms to facilitate the licensing and sale of patents affect not only the firms' ability to assist clients in their direct dealings with other parties but also the firms' ability to represent clients on, or to offer advice in regards to, the intellectual property exchanges. Even though law firms and accounting firms may be able to develop some expertise in representing their clients on the exchanges, providing the services associated with representing clients on the exchanges will likely be inefficient for law firms and accounting firms. The services required by clients in dealing with the intellectual property exchanges will be analogous to brokerage services provided in relation to stock exchanges. However, the providing of such services will require a high degree of expertise in a combination of areas, including trading expertise, negotiation expertise, financial valuation expertise, technical expertise, and legal expertise. Persons qualified to provide such services will require skills above and beyond those of (or at least different than those of) typical lawyers (patent or otherwise), accountants or managers.

Intellectual property brokerages also are hindered by certain limitations that prevent their effective facilitation of intellectual property transfer. Although intellectual property brokerages sometimes take equity interests in their clients, generally such brokerages do not purchase, obtain licenses (including the rights to sublicense) in, or otherwise obtain intellectual property rights in the intellectual property of their clients. Rather, the intellectual property brokerages provide services to facilitate the sale, licensing or other development of their clients' intellectual property, and the brokerages are paid for their services by way of up-front fees or commissions. Consequently, intellectual property brokerages are hindered by a lack of certain incentives for employees (e.g., a lack of institutional mission) and a lack of flexibility. The employees of intellectual property brokerages do not typically obtain the individual satisfaction of "ownership" (or even a lesser possessory interest) in the intellectual property interests with which the brokerages are dealing, and the employees are not involved in any tangible "building-up of the enterprise" that could give the employees a special type of satisfaction and motivation. The brokerages and their employees must constantly adapt to the ever-changing, sometimes short-sighted demands of their clients.

Additionally, because the intellectual property brokerages lack ownership of intellectual property assets (or possession of interests in/rights to the intellectual property), the brokerages' value is determined almost exclusively by the talent of their personnel or "human capital." As with respect to many service firms, this lack of identifiable assets can limit the brokerages' ability to raise capital (e.g., through public trading of the brokerages' stock on stock exchanges). This inability to raise capital in turn limits the brokerages' effectiveness in facilitating intellectual property transfer. As in the biotechnology industries, where identifying market needs and developing valuable, marketable products requires great expenditures sustained over long periods of time, the identification and development of opportunities for intellectual property transfer can require investments over a long period of item. Intellectual property transfer often is a complicated, risky business requiring significant patience. Because brokerages lack capital and must respond to the immediate demands of their clients, brokerages must constantly focus on developing the most obvious, easily-attainable, short-term opportunities for intellectual property transfer, and must ignore the more challenging (and often long-term) opportunities.

Given the growing importance of intellectual property assets to companies, given that the value of intellectual property assets could be significantly enhanced by increased and more efficient licensing and sale of intellectual property assets, and given the limitations of intellectual property asset exchanges, law firms, accounting firms, and intellectual property brokerages in facilitating intellectual property transfer, there exists a critical need for a system for facilitating the transfer of intellectual property such as the licensing and sale of patents. Further, because of the continuing development and increasing use of computer and telecommunications technologies generally, and the internet specifically, including the development and use of such systems by and in relation to the intellectual property asset exchanges, there exists at present a critical need for a system for facilitating intellectual property transfer that employs these modern computer and telecommunications technologies. The need is for, among other things, a system that employs these technologies for the purposes of efficiently interfacing with parties who would like to directly license, sell or purchase intellectual property assets (as well as the parties' representatives, who may include law firms, accounting firms or intellectual property brokerages), interfacing with the intellectual property asset exchanges, processing information obtained from each of these entities, and promoting the transfer of intellectual property assets among these parties.

From the above, it is apparent that it would be advantageous if there was a system in place that facilitated intellectual property transfer (where intellectual property transfer is understood broadly to encompass the transfer of any and all types of intellectual property assets, including patents, trademarks and copyrights). It would be additionally advantageous if such a system was capable of interfacing with companies or individuals who were interested in licensing or selling their intellectual property assets, and with companies or individuals who were interested in licensing (or sublicensing) or purchasing others' intellectual property assets. It would further be advantageous if such a system was capable of streamlining the processes of licensing and selling patents such that the processes (and operation of the system itself) were quick, easy to understand and implement (e.g., standardized), and inexpensive to use, for potential licensors, licensees, sellers and buyers of patents. It would additionally be advantageous if such a system was capable of addressing the needs of many different parties with respect to the transfer of many different patents, in a rapid, efficient manner. It would further be advantageous if such a system eliminated or avoided the constraints faced by law firms and accounting firms in relation to their representation of clients who wish to license, sell or purchase patents.

It would be further advantageous if such a system was capable of interfacing with the emerging computer-based, internet-oriented intellectual property asset exchanges to allow for licensing and selling of patents on those exchanges in an efficient, inexpensive and reliable manner. It would additionally be advantageous if such a system eliminated or avoided the constraints faced by law firms and accounting firms vis-à-vis the intellectual property asset exchanges, and improved (directly or indirectly) the accessibility and efficiency of the exchanges for companies or individuals. It would further be advantageous if such a system was not hindered by the constraints affecting intellectual property brokerages, including overly-demanding clients, a lack of mission for its employees, a lack of capital, or a lack of flexibility (in particular, to pursue long-term, but profitable, opportunities for the transfer of intellectual property). It would additionally be advantageous if such a system was fast-operating, easy to use, and inexpensive to use and operate, by potential licensors, licensees, sellers and buyers of patents, in relation to the intellectual property asset exchanges. It would be further advantageous if such a system was capable of facilitating a multiplicity of different types of intellectual property transfer arrangements involving a multiplicity of different types of licensors, licensees, sellers and buyers.

SUMMARY OF THE INVENTION

The present invention relates to a first method of facilitating the transfer of intellectual property. The method includes obtaining at a computer system of a first entity information concerning intellectual property in which an interest is available for transfer (the "available intellectual property") from a second entity. The method further includes transferring the interest in the available intellectual property by concluding an agreement between the first and second entities. The agreement is representative of an acceptance of an offer concerning the transferring of the interest in the available intellectual property and consideration for the transferring of the interest.

At least a portion of the interest in the available intellectual property that is transferred to the first entity is intended to be transferred from the first entity to a third entity.

In one particular embodiment of this first method, either the obtained information concerning the available intellectual property is obtained at the computer system from an IP exchange computer system, and the method further comprises providing a bid after obtaining the information concerning the available intellectual property; or the method further comprises providing to the IP exchange computer system information regarding an intellectual property interest and then receiving a bid for the intellectual property interest.

The present invention further relates to an additional method of facilitating the transfer of intellectual property. The method includes obtaining at a computer system of a first entity information concerning intellectual property in which a second entity desires to obtain an interest (the "desired intellectual property"). The method additionally includes transferring the interest in the desired intellectual property by concluding an agreement between the first and second entities. The agreement is representative of an acceptance of an offer concerning the transferring of the interest in the desired intellectual property and consideration for the transferring of the interest. At least a portion of the interest in the desired intellectual property that is transferred from the first entity was transferred from a third entity to the first entity.

The present invention additionally relates to a system for facilitating the transfer of intellectual property. The system includes an intellectual property investment bank ("IPIB") computer system having a processor coupled to a memory, a user interface and at least one input/output device. The IPIB computer system is linked to and capable of communicating with at least one of an IP owner computer system, an IP desirer computer system, and an IP exchange computer system. The IPIB computer system is capable of receiving information concerning at least one of intellectual property that is available for transfer (the "available intellectual property") from an IP owner to an IPIB and intellectual property that is desired for transfer from the IPIB to an IP desirer (the "desired intellectual property"). The IPIB computer system is capable of at least one of receiving or providing a signal indicating an acceptance of an offer concerning a transfer of the at least one of the available intellectual property and the desired intellectual property.

BRIEF DESCRIPTION OF THE DRAWINGS

FIG. 3 is a flow chart showing exemplary steps of the IPIB system in relation to IP owners and IP desirers;

DETAILED DESCRIPTION OF THE INVENTION

Figure 1:
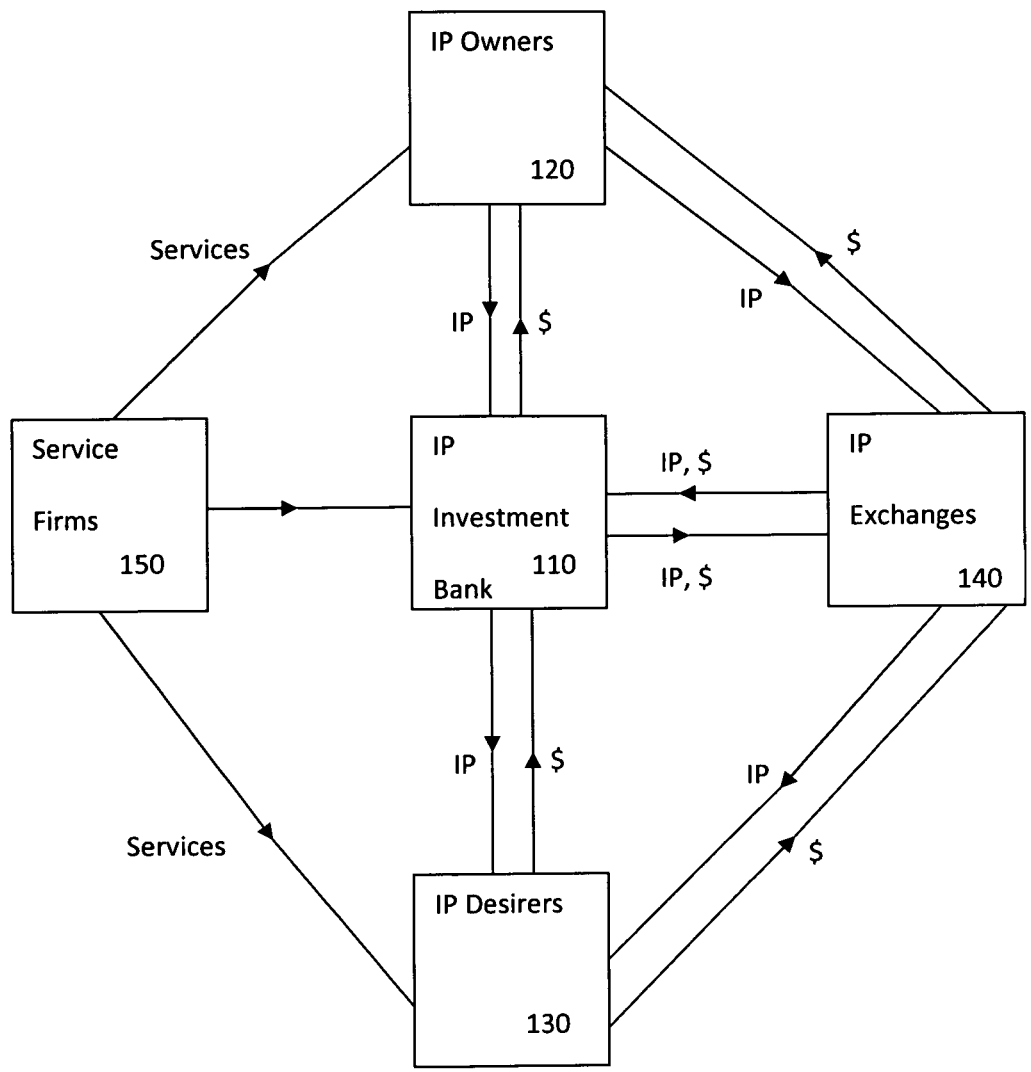
FIG. 1 is a block diagram showing an intellectual property investment bank (IPIB) system for facilitating the transfer of intellectual property including the licensing, selling and purchasing of intellectual property (IP), and the relationships of the system with IP owners, IP desirers, service firms (e.g., law/accounting firms), and IP exchanges.

Referring to FIG. 1, a new system is shown for facilitating the transfer of intellectual property (IP), including transfer by way of licensing, selling and purchasing patents and other IP. The new system assists in overcoming the above-described limitations inherent in the institutions of intellectual property asset exchanges ("IP exchanges"), law firms and accounting firms having intellectual property asset management programs, and intellectual property brokerages. By facilitating the transfer of IP, the new system also facilitates the transfer of technology that occurs along with the transfer of IP. The new system operates in a fashion that is analogous to an investment bank, and could be termed an intellectual property investment bank (IPIB) 110. Analogous to a typical investment bank, which serves as an intermediary between companies wishing to sell their securities and buyers for those securities, IPIB 110 ideally serves as an intermediary between parties who are interested in licensing or selling their patents (IP owners) 120 and parties who are interested in becoming licensees of, or purchasing, patents (IP desirers) 130. Further analogous to a typical investment bank, which interfaces with the securities exchanges, IPIB 110 also interfaces with intellectual property asset exchanges (IP exchanges) 140. Thus, IPIB 110 operates both as a direct intermediary between parties wishing to privately exchange patent rights (IP owners 120 and IP desirers 130) and also as an intermediary acting between such parties and IP exchanges 140, which are at least semi-public.

Also analogous to an investment bank, which purchases clients' securities, IPIB 110 takes an interest in the patents (and other IP) of its clients, the IP owners 120, by obtaining a license to (including a right to sublicense), or purchasing outright, the patents of the IP owners. By licensing or purchasing its clients' patents, IPIB 110 gains a strong and direct financial incentive to sublicense or resell its clients' patents, something which is lacking in law firms and accounting firms (or, collectively, service firms) 150. In the case where IPIB 110 licenses (e.g., sublicenses) the patents of IP owners 120 to IP desirers 130, the IPIB typically retains a proportion of whatever royalties flow from the IPIB's sublicensing of the licensed patents, which align the IPIB's interests with those of the IP owners (from whom the IPIB licensed the patents). As the IPIB 110 obtains more and more interests in a great many IP rights, the personnel of the IPIB will gain greater expertise and the IPIB will become known by IP owners 120 and IP desirers 130 as a significant source of desirable IP and a significant source of opportunities for making use of their existing IP.

Unlike service firms 150, which represent their clients and consequently must avoid conflicts of interests (both with respect to their clients' interests directly and with respect to the simultaneous representation of multiple clients whose interests conflict), IPIB 110 only exists to facilitate IP transfer (rather than to represent clients) and is not (at least directly) restricted by conflicts of interest issues. Thus IPIB 110, like an investment bank for securities, is relatively unconstrained in marketing or otherwise attempting to find licensees (or sublicensees) or buyers for its clients' patents. Further unlike service firms 150, IPIB 110 exists in the corporate form and is flexible in the hiring and training of persons having legal, technical, managerial, trading and other skills necessary to facilitate IP transfer, including skills that relate to IP exchanges 140. In addition, IPIB 110 does not preclude service firms 150 from performing their traditional services for clients, and indeed may require the assistance of such service firms itself.

IPIB 110 does not suffer from the same limitations as IP brokerages as described above. Because IPIB 110 obtains interests in IP assets, rather than merely receiving payment in the form of commissions or up-front fees, IPIB 110 has great flexibility to pursue a variety of types of business strategies in facilitating IP transfer as it sees fit, including strategies that require a more long term approach to identifying markets for and suppliers of desirable IP. In particular, because IPIB 110 has interests in/rights to IP or outright ownership of IP, the IPIB has a greater capacity to raise capital, which facilitates the pursuit of its various business strategies. IPIB 110 also can provide greater motivational satisfaction to employees who contribute to the building of an enterprise with a growing asset base. In certain circumstances, the IPIB 110 can hire IP brokerages to assist in selling and licensing IP to IP desirers 130, purchasing and licensing IP from IP owners 120, or selling, purchasing and licensing to and from IP owners and desirers via the IP exchanges 140. That the IPIB 110 can draw upon the talents of individual employees of IP brokerages in circumstances where those talents are particularly helpful in promoting the transfer of IP is one of the strengths of the IPIB. However, since IP brokerages only perform a middle-man type function between the IPIB 110 and the IP owners 120, IP desirers 130 and IP exchanges 140, and since the IP brokerages' services are only sometimes drawn upon by the IPIB, the IP brokerages are not shown in FIG. 1.

As shown in FIG. 1, IPIB 110 interacts with IP owners 120, IP desirers 130, IP exchanges 140 and service firms 150 in at least the following ways. IPIB 110 obtains patents and other IP, including patent licenses, from IP owners 120. IPIB 110 resells, licenses or sublicenses the patents and other IP (including licensed patents) to IP desirers 130 who are interested in purchasing or licensing the IP. Upon purchasing patents and other IP from IP owners 120, IPIB 110 will pay the IP owners for the IP. Upon reselling or licensing purchased patents, IPIB 110 will be paid by IP desirers 130. In the case where IPIB 110 licenses IP from IP owners 120 and in turn sublicenses the IP to IP desirers 130, the IPIB will typically not pay the IP owners up front upon licensing the IP but rather will only pay the IP owners a proportion of any payments received (e.g., royalties) from the IP desirers (although up-front payment of IP owners is also possible).

IPIB 110 also interacts, at least in certain circumstances, with IP exchanges 140. By interacting with these public or semi-public IP exchanges 140, IPIB 110 will be able to broaden its ability to market (or disseminate information about) the IP that it owns or has licensed, and to find IP desirers 130 interested in purchasing or licensing that IP. Likewise, IPIB 110 will also obtain new information about, and new opportunities to purchase or license, IP from IP owners 120 through IP exchanges 140. As shown in FIG. 1, IPIB 110 will both sell and license IP to IP desirers 130 via IP exchanges 140, and purchase and license IP from IP owners 120 via the IP exchanges. Correlatively, IP owners 120 will receive payments for the IP from IPIB 110 via IP exchanges 140, and IP desirers 130 will make payments to the IPIB via the IP exchanges. Further as shown in FIG. 1, service firms 150 (e.g., law firms and accounting firms) will continue to provide legal, accounting and related services to the clients they represent, which will continue to include IP owners 120 and IP desirers 130, and will also include IPIB 110 in some circumstances.

Turning to FIGS. 2(*a*) and 2(*b*), block diagrams are provided showing exemplary internal elements of an IPIB computer system 210 of IPIB 110. FIG. 2(*a*) shows a general form of IPIB computer system 210, which can be either internet-based or not internet-based. In FIG. 2(*a*), IPIB computer system 210 is shown to be linked to computer systems 220, 230 and 240 of IP owners 120, IP desirers 130 and IP exchanges 140, respectively, by communication links 250, 260 and 270, respectively. Communication links 250, 260 and 270 are typically electronic communication links, such as telephone lines, cable lines, optical fiber lines or wireless (including satellite) communication links, although other types of links are possible as well. Communication links 250, 260 and 270 are capable of allowing communication between computer system 210 and computer systems 220, 230 and 240 over the internet (e.g., the worldwide web) as well as over more private networks or limited communication arrangements. Communication links 250, 260 and 270 are meant to include various intermediate telecommunications facilities that are necessary for allowing communication over communication links 250, 260 and 270. FIG. 2 is meant to indicate that IPIB computer system 210 can be linked to any or all of computer systems 220, 230 and 240, but need not be linked to any or all of these computer systems at any one time.

IPIB computer system 210 preferably includes an input/output system 218 for allowing communication with (for providing information to and receiving information from) computer systems 220, 230 and 240 over communication links 250, 260 and 270. Also within computer system 210 is a processor 214, which is coupled to a user interface 212, a memory 216 and input/output system 218. Processor 214 can be any computerized processing device (including electronic and non-electronic technologies, and hardware and software), such as a microprocessor, microcontroller, personal computer, mainframe computer or supercomputer (with or without parallel processing capabilities). Memory 216 includes program information for directing the operation of processor 214, and also can include information (including database information) regarding IP and IP owners 120, IP desirers 130 (including information regarding available and desired IP), IP exchanges 140 and service firms 150. Indeed, memory 216 is capable of storing any of the information described below (with respect to FIGS. 3-6) as being accessed by IPIB computer system 210. User interface 212 of computer system 210 is a computer terminal (e.g., with a keypad and monitor), touch screen, voice-actuated input/output system or other interface which allows interaction between employees (including management) of IPIB 110 with IPIB computer system 210.

Many embodiments of IPIB computer system 210 are possible and different embodiments would be appropriate for different circumstances of operation. If IPIB computer system 210 has relatively few interactions with computer systems 220, 230 and 240 of IP owners, desirers and exchanges 120, 130 and 140, a single personal computing system (e.g., a desktop computer) could be appropriate for use as computer system 210. If IPIB computer system 210 has a great many interactions with computer systems 220, 230 and 240 of the IP owners, desirers and exchanges, more powerful computer systems and, in many cases, a multiplicity of computer systems (each potentially having separate or redundant communication links with the computer systems of the same or different IP owners, desirers and exchanges). In certain embodiments, IPIB computer system 210 can consist of a network of many separate computer systems. Further, in certain embodiments, user interface 212 can become effectively unnecessary because IPIB computer system would be completely automated. In such embodiments, IPIB computer system 210 would automatically conduct all transactions between IPIB 110 and IP owners, desirers and exchanges 120, 130 and 140 and not require decisionmaking inputs or other expertise from employees of the IPIB (human beings would only need to access the system in order to program or modify it, or to loosely monitor its operation).

Figure 2A:
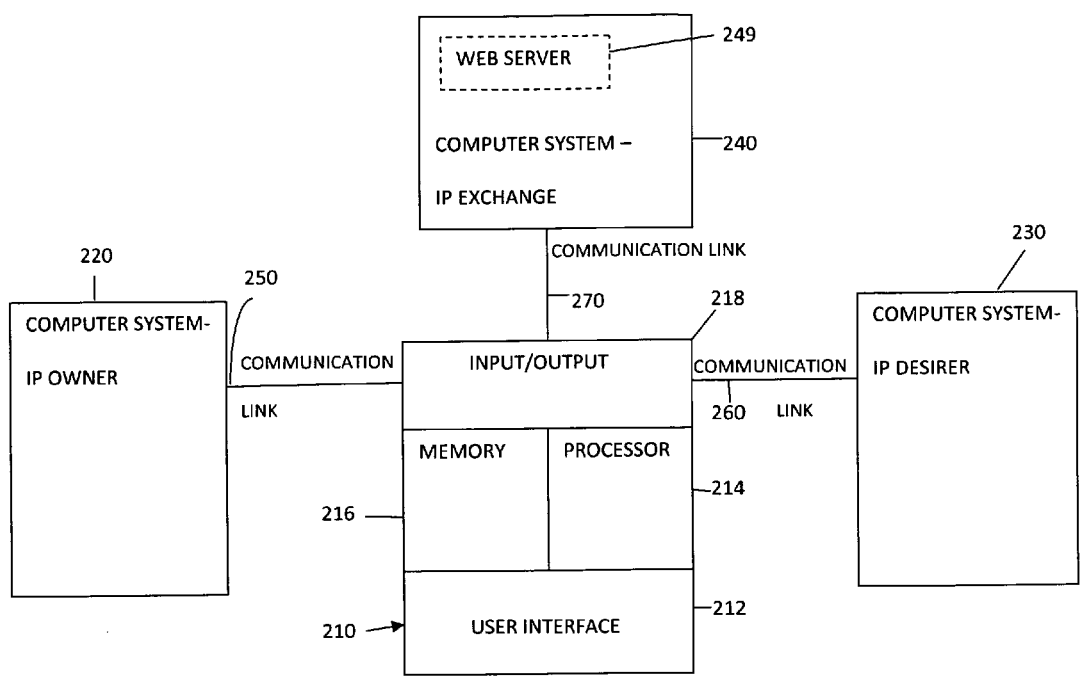
FIGS. 2(*a*)-(*c*) are block diagrams showing exemplary internal elements of the IPIB system of FIG. 1 and exemplary communication links of those elements to systems of IP owners, IP desirers and IP exchanges.
Figure 2B:
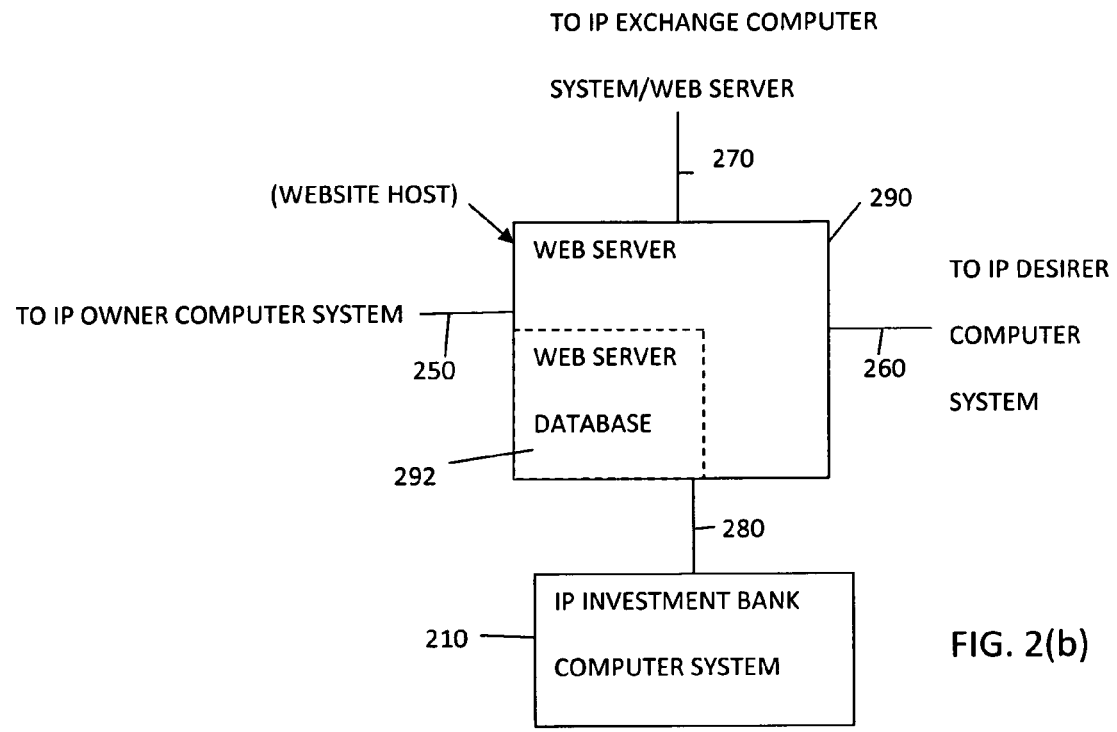
Figure 2C:
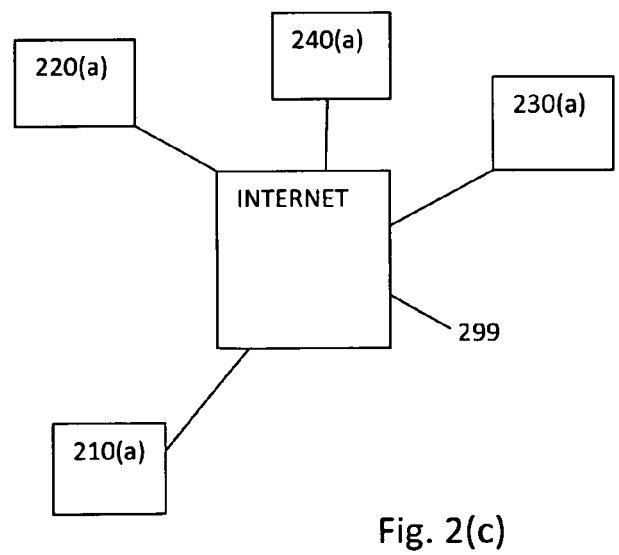

In the preferred embodiment of the invention, IPIB computer system 210 operates as an internet-based facility for conducting the sale, purchase and licensing (and other transfer) of IP to and from IPIB 110 over the internet. FIG. 2(a) is meant to include an internet-based embodiment of IPIB computer system 210, in which the computer system operates a website that can be accessed by and communicate with any (or all) of computer systems 220, 230 and 240. FIG. 2(c) shows in particular such an internet embodiment in which an internet-capable IPIB computer system 210(a) is coupled by way of the internet 299 to internet-capable computer systems 220(a), 230(a) and 240(a) for an IP owner 120, an IP desirer 130 and an IP exchange 140, respectively. For IPIB computer system 210 to be capable of operating in conjunction with the internet, the IPIB computer system would require the use of one or more web servers (or web server programs) that would host the website of IPIB 110.

Although in FIG. 2(a) individual communication links are shown connecting IPIB computer system 210 with each of IP owner computer system 220, IP desirer computer system 230 and IP exchange 240, computer systems 220, 230 and 240 can be coupled to the IPIB computer system via shared or multiplexed links (including a single link) or a variety of other types of links used in connection with the internet or without the interne. In the embodiment of FIG. 2(c), the IPIB computer system 210(a) is connected by a single line to the internet 299, by which it is then coupled to the remaining computer systems 220(a), 230(a), and 240(a). IPIB computer system 210 can be operably connected to the internet (as typically would IP owner computer system 220, IP desirer computer system 230 and IP exchange computer system 240) using a variety of techniques that are well known in the art, including Java™ based programming (developed by Sun Microcomputer Corp. of Palo Alto, Calif.) or the TCP/IP protocol.

Web server functionality can be provided by the elements of IPIB computer system 210 that are shown (e.g., processor 214, memory 216, and input/output 218) or by an additional computer (or computer elements) in communication with those elements. However, FIG. 2(b) shows a common arrangement in which IPIB 110 does not own a web server 290 that hosts the website of the IPIB (nor is the web server directly part of IPIB computer system 210), but merely has an agreement with a company operating the web server allowing that company to host the website on behalf of the IPIB. In such an embodiment, IPIB computer system 210 is in communication with web server 290 (which can have its own web server database 292 and other computer elements, which are not shown) over an additional communication link 280 (which can have any of the properties discussed above with respect to communication links 250, 260 and 270). The web server 290 forms a hub of communications between IPIB computer system 210, and computer systems 220, 230 and 240 of IP owners 120, IP desirers 130 and IP exchanges 140. Even in this embodiment, IPIB computer system 210 can be broadly thought of as encompassing web server 290, since the website operated by the web server acts as an extension of the operational capabilities of the IPIB computer system.

In the preferred, internet-oriented embodiment of the invention, IP owners 120, who are interested in licensing or selling IP to IPIB 110, as well as IP desirers 130 who are interested in licensing or purchasing IP from the IPIB, contact the website of the IPIB through the use of their respective computer systems 220, 230. Information provided by IP owners 120 and IP desirers 130 to IPIB computer system 210 via the website (and web server) is processed and stored by the IPIB computer system (the information can in some embodiments also be processed and stored at web server 290). Information provided to IPIB computer system 210 can be reviewed by employees of IPIB 110 via user interface 212. Information can also be provided by IPIB computer system 210 to computer systems 220, 230 of IP owners and desirers 120, 130 via the website. Such transferred information can include offers and/or acceptances concerning the execution of contractual arrangements. In certain embodiments in which computer systems 220, 230 of IP owners 120 or IP desirers 130 also provided websites (or other similar interactive interfaces), IPIB computer system 210 is capable (at least in a certain mode of operation) of submitting information to or receiving information from such websites, and/or is capable of allowing employees of IPIB 110 to interact with such websites directly via user interface 212.

As discussed, IP exchanges 140 have developed at least partly as a result of the development of the interne, and consequently are typically internet-based systems that have websites of their own. As shown in FIG. 2(a), computer system 240 of IP exchange 140 typically will have or operate in conjunction with a web server 249, which hosts or operates the website of the IP exchange. Computer systems 240 of IP exchanges 140 have large databases of information regarding patents and other IP that IP owners 120 are interested in selling or licensing. Sometimes, the computer systems also have databases of information provided by IP desirers 130 indicative of IP they are interested in purchasing or licensing. Records of past activities of IP owners and IP desirers 120, 130 that concern IP transfer may also be kept, although some IP exchanges 140 maintain strict privacy policies maintaining the confidentiality of their members. Parties accessing the websites of IP exchanges 140 (who may need password or other membership rights in order to do so) are able to add information to the website (e.g., regarding IP that they are interested in selling or licensing). Also, the parties are able to search through, browse, and retrieve existing information in the databases, and to place bids or otherwise initiate and conclude transactions involving the sale or licensing of IP (or at least to indicate an interest in doing so). Certain IP exchanges 140 offer additional services to their members, e.g., patent invalidity insurance or patent valuation services. The provision of, or at least agreement to provide, such services can also be concluded via the websites of IP exchanges 140.

Preferably, IPIB computer system 210 is capable of interacting with such highly-developed internet (or other computer-based) systems of IP exchanges 140, in addition to the computer systems 220, 230 of IP owners and IP desirers 120, 130. In one embodiment, an employee of IPIB 110 interacts with a computer system 240 of an IP exchange 140 by logging onto the website of computer system 240 via user interface 212 of IPIB computer system 210 (which is in communication with computer system 240 through the use of a conventional browser program via communication link 260). In a second embodiment, IPIB computer system 210 employs specialized programming (or otherwise has special operating capabilities) that allows the IPIB computer system to seamlessly interface with the programming of computer system 240 of IP exchange 140. Such programming eliminates the necessity of having employees of IPIB 110 directly interface with the website (or other interactive interface) of IP exchanges 140, and can mitigate the complexity associated with interfacing with the websites of different IP exchanges, which can vary significantly in their features and operation. Instead, the employees merely provide inputs or outputs at user interface 212 that direct the operation of IPIB computer system 210, and it is computer system 210 that interfaces with the website (or other computer interface) of IP exchange 140. Such specialized programming allowing for such coordinated operation of IPIB computer system 210 and computer system 240 of IP exchange 140 would be most easily developed jointly by the IP exchange in conjunction with IPIB 110. The specialized programming can, but need not, allow for coordination of the website of IPIB 110 with the website of website of IP exchange 140; rather, the programming need only allow IPIB computer system 210 to communicate with IP exchange computer system 240, by way of the interne, websites, or otherwise.

Turning to FIG. 3, a flow chart 300 is provided showing steps of operation of IPIB computer system 210 in relation to computer systems 220, 230 of IP owners 120 and IP desirers 130, respectively. The steps shown are exemplary and are especially applicable with respect to the preferred, internet-oriented embodiment of the IPIB computer system 210, although similar steps are readily applicable to other computer-based, or even non-computer based systems. Hereinafter, IPIB computer system 210 will be understood to include a web server, or at least operation in conjunction with a web server such as web server 290, such that the operation the website for IPIB computer system can be considered to be part of the operation of the IPIB computer system.

Most commonly, IP owners 120 and IP desirers 130 will contact IPIB 110 when they have IP that they are interested in selling purchasing or licensing (or otherwise transferring) by visiting the website of IPIB computer system 210 by way of a standard browser or similar program. Thus, in step 310, IPIB computer system 210 receives initial contact from a visitor (e.g., computer systems 220, 230) at the website. Upon receiving this initial contact at the website, IPIB computer system 210 provides initial descriptive information regarding IPIB 110 to the visitor in step 315. Such information is provided because visitors to the website can have little or no knowledge of the purpose or functions of IPIB 110. In certain circumstances, steps 310 and 315 need not be performed because, for example, the visitor is in constant contact with IPIB computer system 210 or does not require descriptive information regarding IPIB 110.

Next, IPIB computer system 210 attempts to determine the identity and purpose of the visitor. In step 320, IPIB computer system 210 obtains identification information from the visitor to the website. Various information can be obtained in step 320. For example, identity information such as name or company name, address, email address and phone number can be obtained. Further (assuming that IPIB computer system 210 is configured to receive visits from both IP owners 120 and IP desirers 130), it will be important to obtain information regarding whether the visitor has IP that the visitor is interested in licensing or selling (e.g., identifying the visitor as an IP owner), or whether the visitor is interested in licensing or purchasing IP from the IPIB (e.g., identifying the visitor as an IP desirer). To obtain a variety of types of identification (and purpose) information from the visitor, IPIB computer system 210 can prompt the visitor with a series of questions, to which the visitor is requested to provide answers.

Alternatively, IPIB computer system 210 can provide an on-line questionnaire with one or more fields for data entry from the visitor. Upon obtaining such identity information, IPIB computer system 210 optionally can provide the visitor with a special identification (e.g., a username and password) in step 325, which would simplify the identification process during repeat visits (e.g., by allowing a simple login process). Thus, during repeat visits, the visitor could simply enter the special identification in place of the usual identification information (in such cases, step 325 would be skipped). In certain other circumstances, no identification information is required from the visitor (and both steps 320 and 325 are unnecessary), for example, where IPIB computer system 210 maintains constant communication via a direct link with the visitor.

Once the visitor has been identified, in step 330 IPIB computer system 210 obtains information regarding the nature of the IP the visitor wants to sell, purchase or license. In the case where the visitor is an IP owner 120 (step 330(*a*)), IPIB computer system 210 obtains information identifying the IP that the IP owner is interested in licensing or selling—for example, in the case of a patent, the patent number, the filing (or issue) date of the patent (e.g., time until expiration of the patent), and/or the inventor can be specified, among other information. Additionally, in the preferred embodiment, IPIB computer system 210 attempts to obtain more specific information summarizing or otherwise indicating the nature of the technology covered by the IP, and the potential products or markets that can be covered by the IP. That is, the nature of the IP refers to, for example, the identity, type, and technological/product/market scope of coverage of the IP assets that are available for transfer, although the nature of the IP is not necessarily limited to these particular concepts.

The information concerning the nature of the IP can allow various determinations to be made by IPIB 110 (either by an employee of the IPIB or automatically by IPIB computer system 210), such as determinations regarding the potential value of the IP, and determinations as to what type of transfer from IP owner 120 to the IPIB would be most appropriate (e.g., license or sale). In the case where the visitor is an IP desirer 130 (step 330(*b*)), IPIB computer system 210 obtains information regarding the type of IP asset and/or the type of technology that the IP desirer is interested in purchasing or licensing. This information will also allow various determinations to be made by IPIB 110, such as determinations regarding whether the IPIB owns or is currently licensing IP that covers this type of technology.

In performing step 330, IPIB computer system 210 preferably prompts the visitor with a series of questions regarding the nature of the IP that the visitor wants to sell, purchase or license. Alternatively, other forms of data entry are possible; for example, IPIB computer system 210 can provide an on-line questionnaire with one or more fields for the entry of specific data by the visitor, or merely an "open space" in which the visitor can enter whatever information the visitor wants. IPIB computer system 210 can employ graphical user interfaces (GUIs), and also can utilize data entry formats that are personalized for particular users. Further, although obtaining such information via the website of IPIB computer system 210 is the preferred method of operation, the information can also be communicated to the IPIB computer system by having IP owner 120 or IP desirer 130 mail in such information (or otherwise provide such information in another manner) and having an employee of the IPIB input such information at user interface 212. Additionally, in certain circumstances, step 330 need not be performed at all. For example, step 330 need not be performed every time a particular IP owner 120 or IP desirer 130 repeatedly logs into IPIB computer system 210, if the information has already been provided during an earlier visit of the IP owner or IP desirer to the website. In such case, the visitor can simply check a box (or potentially need not do anything at all) indicating that previously-provided information from the visitor is still correct.

Upon receiving the information from IP owner 120 or IP desirer 130 concerning the nature of the IP that the IP owner or IP desirer wish to sell, purchase or license, employee(s) of IPIB 110 (or IPIB computer system 210 itself, automatically) usually makes determinations as to the value of the IP available from the IP owner or the availability of the IP desired by the IP desirer. In steps 335(*a*) and 335(*b*), respectively, IPIB computer system 210 processes the information received from IP owner 120 or IP desirer 130, respectively, to allow for such determinations to be made. This processing can take a number of forms. For example, if information concerning transferable IP was provided from an IP owner 120, IPIB computer system 210 can perform a status check to make sure that the IP asset (at least according to public databases such as the U.S. Patent and Trademark Office databases or the database(s) of the IPIB) is indeed owned or otherwise assigned to the IP owner.

Also, IPIB computer system 210 can analyze product and/or market information provided by IP owner 120 to facilitate financial valuation of the IP. Further, a comparison can be made of the technologies, products and markets identified by IP owner 120 as being implicated by the IP, with information held in a database of IPIB 210 concerning the needs of IP desirers 130 who have contacted the IPIB (or whose needs are otherwise known by the IPIB, by way of market studies, etc.). If information concerning desired IP was provided from an IP desirer 130, IPIB computer system 210 can compare the descriptions of the desired IP with information in a database of IPIB 210 concerning the IP that is owned by or licensed to IPIB 110. Additionally, a comparison can be made of the descriptions of the desired IP with descriptions of potentially-transferable provided by IP owners 120 who have contacted IPIB 110, or even with information listed on public or private databases (such as the U.S. Patent and Trademark Office databases). Assuming IP owners 120 can be identified who are in a position to provide desired IP (including the identification of IP owners by checking the assignee status of patents listed on databases such as the U.S. Patent and Trademark Office databases), such IP owners can be contacted (with the goal of licensing or purchasing their IP).

The processing of step 335 can encompass, in particularly sophisticated embodiments of IPIB computer system 330, processing which automatically determines whether the IP available from an IP owner 120 is desirable, or whether the IP desired by an IP desirer 130 is available. Also, the processing of step 335 can encompass the providing of the information from IP owners 120 or IP desirers 130 regarding the nature of the available IP or desired IP, respectively, to an employee of IPIB 110, who in turn analyzes and makes determinations based upon that information. Additionally, the processing of step 335 can encompass storage of the information in memory 216 (or another memory or database) of IPIB computer system 210 (to allow for later processing or other use of the information). Further, in alternate embodiments, the processing of step 335 is not performed, particularly if the information obtained in step 330 from the visitor is directly provided to an employee of IPIB 110 for analysis. In some cases, an IPIB 110 may have a policy of purchasing or at least licensing all IP available from IP owners 120, in which case processing used to allow the selection of desirable IP will be unnecessary. Possible attributes of step 335 are further discussed below with respect to FIGS. 5(*a*) and 5(*b*).

Once it is determined by IPIB 110 that the IP available for transfer from IP owner 120 is of interest to the IPIB, or that the IP desired by IP desirer 130 may be provided by the IPIB, IPIB computer system 210 proceeds to step 340. (If it is determined that the IP available for transfer from IP owner 120 is not of interest, or that the IP desired by IP desirer 130 cannot be provided, an indication is provided to the IP owner or IP desirer indicating that the IPIB is not interested in proceeding with a transaction at this time.) IPIB computer system 210 obtains further information from IP owner 120 (in step 340(*a*)) or IP desirer 130 (in step 340(*b*)) regarding the particular rights the IP owner or IP desirer is interested in transferring or receiving, respectively. In particular, IPIB computer system 210 obtains information as to whether IP owner 120 desires to license the IP or to sell it outright, or whether IP desirer 120 desires to license (or sublicense) the IP or to purchase it outright. Further, in the case where IP owner 120 desires to license rather than sell the IP to IPIB 110, IPIB computer system 210 obtains information regarding whether the IP owner prefers to grant an exclusive or a nonexclusive license. (It will only seldom be possible, or most profitable, for IPIB 110 to grant an exclusive license to a particular IP desirer 130.)

In performing step 340, IPIB computer system 210 can prompt the visitor with a series of questions regarding the IP rights the visitor wants to sell, purchase or license. Alternatively, other forms of data entry are possible; for example, IPIB computer system 210 can provide an on-line questionnaire with one or more fields for the entry of specific data by the visitor, or merely an "open space" in which the visitor can enter whatever information the visitor wants. A variety of relevant information can be obtained in step 340, in addition to information regarding whether the visitor is interested in licensing rather than selling or purchasing IP (and, in the case where the visitor desires a licensing arrangement, information regarding whether the visitor desires an exclusive or nonexclusive license). Of particular importance can be information regarding standard issues that are typically important in virtually any licensing agreements or assignment agreements (e.g., agreements concerning the sale or purchase of IP). In the case where the visitor desires a licensing arrangement, for example, the information obtained by IPIB computer system 210 can include: the desired time period and desired expiration date of any licensing arrangement; any desired territorial restrictions on the license; any desired restrictions on sublicensing (including restrictions on sublicensing to competitors or certain companies); whether the license applies to all manufacturing (making), using and selling of products covered by the IP; termination of the license arrangement; and the payment of royalties (including possible minimum royalties or variation in royalties as a function of different factors).

In the case where the visitor desires to sell or purchase IP from IPIB 110, the information obtained by IPIB computer system 210 could potentially include a proposed price for the IP being bought or sold. However, typically it would be IPIB 110 that would first propose a price for the IP to be sold or bought, based upon its more extensive knowledge of the value of IP generally (or, in the case where the visitor was an IP desirer 130 desiring to purchase IP, based upon the amount the IPIB originally paid for the IP). Other types of information may also be obtained during step 340. In certain embodiments, information obtained in step 340 can include a confirmation that an IP owner 120 has been assigned the IP rights that the IP owner wishes to transfer. Further, in some circumstances, it will be understood that IP owner 120 is only interested in transferring specific IP rights to IPIB 110 (for example, it can be assumed, under certain circumstances, that the IP owner is only interested in selling the IP outright), or that IP desirer 130 is only interested in receiving specific IP rights. If the conditions for such transfers are well understood or otherwise standardized (e.g., because the conditions have been developed over time, in a course of dealing between IPIB 130 and IP owner 120 or IP desirer 130), it can become unnecessary to perform step 340.

In the preferred embodiment of the invention, a visitor first provides information regarding the nature of the IP that is available or desired for transfer, which is then processed (steps 330 and 335). Only later does the visitor then provide additional information regarding the specific IP rights that are the visitor wishes to be transferred (and the limitations on the IP rights that can be transferred), which is then processed and used to generate a proposed agreement (steps 340 and 345). Distinguishing between information concerning the nature of the IP assets themselves and the specific (intellectual) property rights that the visitor is interested in having transferred is useful because it is typically the nature of the IP assets themselves (e.g., whether the asset is a patent, or only a patent application, or whether the patent covers automobiles rather than merely engine valves) that determines the intrinsic value of the IP, both financially and in terms of whether IPIB 110 can identify specific third parties who are interested in the IP. Once the intrinsic value of the IP is determined, this intrinsic value can be adjusted to account for the particular constraints limiting the ownership or possession of the IP that are desired by the IP owner 120, IP desirer 130 or IPIB 110. While the preferred embodiment of the invention does distinguish between information regarding the nature of the IP and information regarding the specific IP rights to be transferred, some alternate embodiments make no such distinction, for several reasons. In certain circumstances, for example, the relative importance of one of the types of information to the other types of information is very low, and so all information can be obtained together (and then, if necessary, processed together). Also, it can be desirable to reduce the complexity of the website of IPIB 110 with which visitors must interact, and so it can be desirable to reduce the number of steps for inputting information to a single step (for all information concerning the IP) for that reason. Thus, all relevant information will be obtained (and, if necessary, processed together).

Upon completion of step 340, IPIB 110 has sufficient information from the visitor (either IP owner 120 or IP desirer 130) to generate a proposed agreement or offer concerning the transfer of IP between the visitor and the IPIB. Such a proposed agreement is generated in step 345. Step 345 in most embodiments can be assumed to include a processing substep similar to step 335, with respect to the information obtained in step 340; such processing can also include further processing with respect to the information obtained in step 330. The proposed agreement can be generated by an employee of IPIB 110 (for example, an in-house attorney of the IPIB) or automatically by IPIB computer system 210. Automatic generation of such an agreement by IPIB computer system 210 would be particularly feasible if all information obtained from a visitor in steps 320, 330 and 340 was obtained from answers provided by the visitor in response to prompting by the IPIB computer system. Assuming such prompted answers were properly provided by the visitor, IPIB computer system 210 could be programmed to generate a standard IP transfer agreement, tailored to include the specific information (or requests) of the visitor. If certain requests of the visitor were considered objectionable or unacceptable, IPIB computer system 210 could provide a proposed agreement and, in addition, provide a list of the unacceptable conditions, which could include reasons as to why those conditions were unacceptable.

Standard agreements for the license or sale/purchase of IP can be obtained from many existing sources (e.g., in the case of licensing agreements, one can turn to *Drafting Patent License Agreements, Fourth Edition*, by Brian G. Brunsvold and Dennis P. O'Reilley, The Bureau of National Affairs, Inc., 1998). Information regarding such agreements and their preparation could be stored in memory 216 of IP computer system 210 (or another memory device). In the case of obtaining licenses from IP owners 120, every agreement between IPIB 110 and such IP owners typically should include a clause giving the IPIB the right to sublicense to third parties, to give the IPIB the ability to sublicense the IP to IP desirers 130 (which rights are typically not presumed to exist in the absence of affirmative statements in the licensing agreements). (In the case of virtually any license agreement, the seller or licensor should provide a warranty that it has the ability to sell or license the IP as specified under the agreement.) In certain circumstances, agreements can be generated without the obtaining of any specific information regarding the specific intellectual property rights to be transferred (e.g., information obtained in step 340), because the transaction conditions are completely standard.

Next, in step 350, the proposed agreement concerning the transfer of IP between the visitor and IPIB 110 is provided to the visitor from IPIB computer system 210 (by sending the agreement to computer system 220 or 230 depending upon whether the visitor is an IP owner 120 or an IP desirer 130). Typically, the agreement provided to the visitor in step 350 constitutes an offer that the visitor is able to accept or reject. Thus, in some cases, IPIB computer system 210 receives a response from the visitor indicating the visitor's acceptance of the agreement in step 355, and an IP transfer arrangement (e.g., for the sale, licensing or purchase of IP) is concluded. In other cases, IPIB computer system 210 receives a response from the visitor indicating the visitor's objections to the proposed agreement, in step 360. The objections can be in the form of a complete rejection or a counteroffer. If the objections are in the form of a counteroffer, IPIB computer system 210 can respond to the objections with an acceptance, in step 365 (thus concluding a IP transfer arrangement).

If the objections constitute an outright rejection, IPIB computer system 210 can respond by generating a new proposed agreement and returns to step 345. Likewise, if the objections are in the form of a counteroffer, IPIB computer system 210 can also return to step 345 to generate a revised proposed agreement. To the extent that standardized agreements are employed, the revision of the IP transfer agreement in steps 360, 345 and 350 can be almost entirely (if not entirely) automated. However, if special (e.g., non-standard) arrangements are demanded by the visitor (and received by IPIB computer system 210 in step 360) or are otherwise necessary, an employee of IPIB 110 typically must generate (or at least assist in generating, e.g., review) each proposed agreement before it is provided to the visitor in step 350. It should be noted that, in certain circumstances, objections can be minor. One embodiment of the program would allow such objections to be presented (e.g., by checking a box) by a visitor even though the visitor basically accepted the proposed agreement. In such an embodiment, it would be possible for IPIB computer system 210 to receive an acceptance response plus additional comments. (Similarly, in another embodiment, IPIB computer system 210 would be able to provide an acceptance, in response to the objections of the visitor, along with minor comments to the visitor.)

Once an agreement has been reached between the visitor and IPIB 110, payment can be automatically made. In the case of an agreement between IPIB 110 and IP owner 120, a payment is made from the IPIB to the IP owner, in step 370(a). In the case of an agreement between IPIB 110 and IP desirer 130, a payment is received by the IPIB from the IP desirer, in step 370(b). Such payments can be made via the internet by way of standard credit card transactions (if the payments are small enough), particularly in the case of IP desirer 130 paying IPIB 110. In such case, payment includes the receiving of a credit card number (and related information) by IPIB 110 from IP desirer 130, and the debiting of the credit card (in the case where IPIB 110 was using a credit card to pay IP owner 120, IPIB would provide the IP owner with a credit card number and related information). Commonly, the payments are too substantial to be handled using a credit card. In such case, information such as a bank account number and/or routing number can be provided by IPIB 110 to IP desirer 130 or, in the case of a transfer of IP between IP owner 120 and the IPIB, such information is received by the IPIB. Payment in step 370 can include other payment methods known in the art. In the case where IPIB 110 is sublicensing IP that it has licensed from IP owner 120, the IPIB often will not be required to make any royalty payments until such time as an IP desirer 130 pays royalties. In such cases, payment step 370 does not occur immediately or even soon after the conclusion of a licensing agreement between IP owner 120 and IPIB 110. Further, many alternate payment methods are possible besides electronic payment, and in some cases no payments will be made (e.g., a gift of IP) making step 370 unnecessary.

Figure 4:
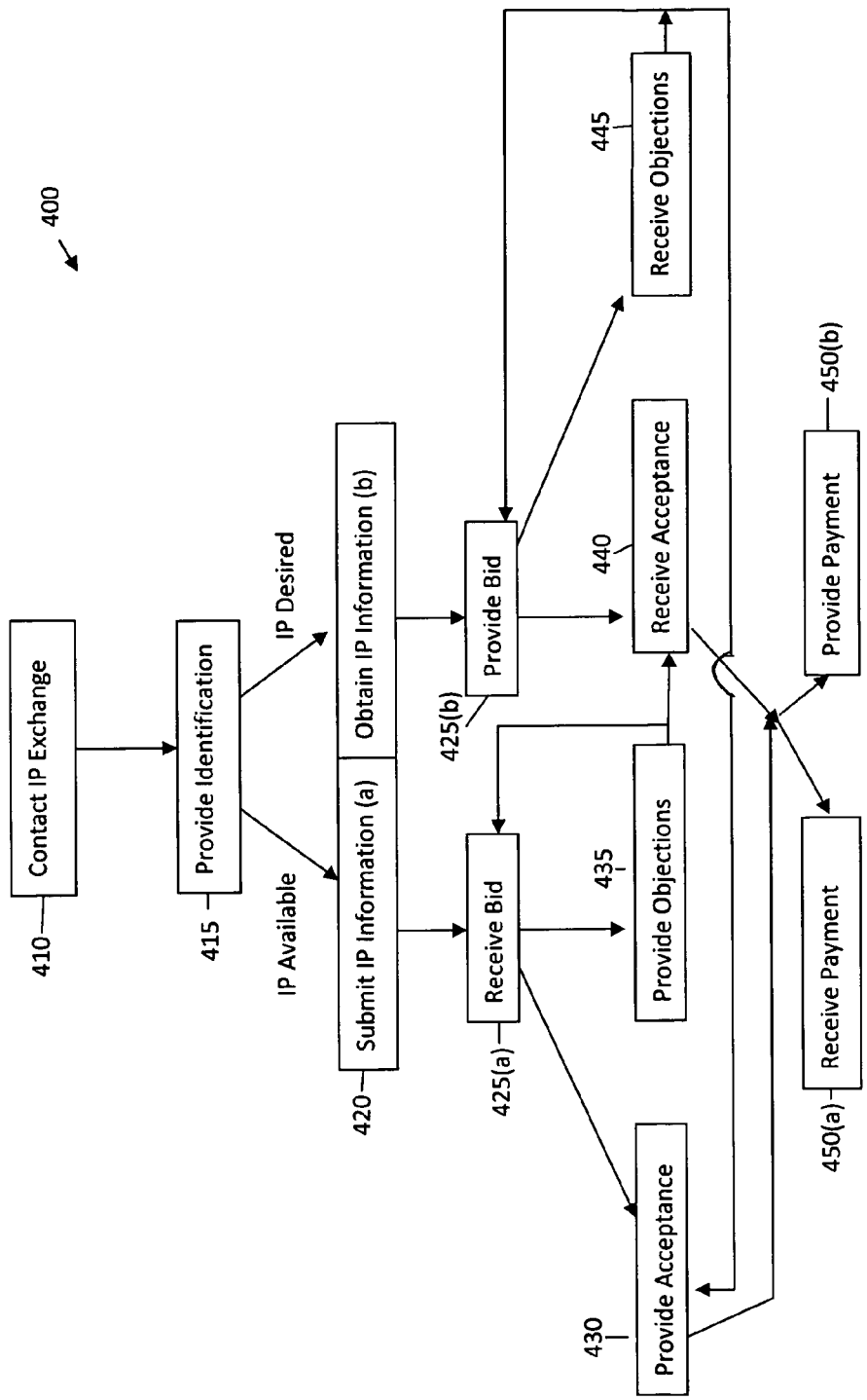
FIG. 4 is a flow chart showing exemplary steps of the IPIB system in relation to IP exchanges.
Figure 5B:
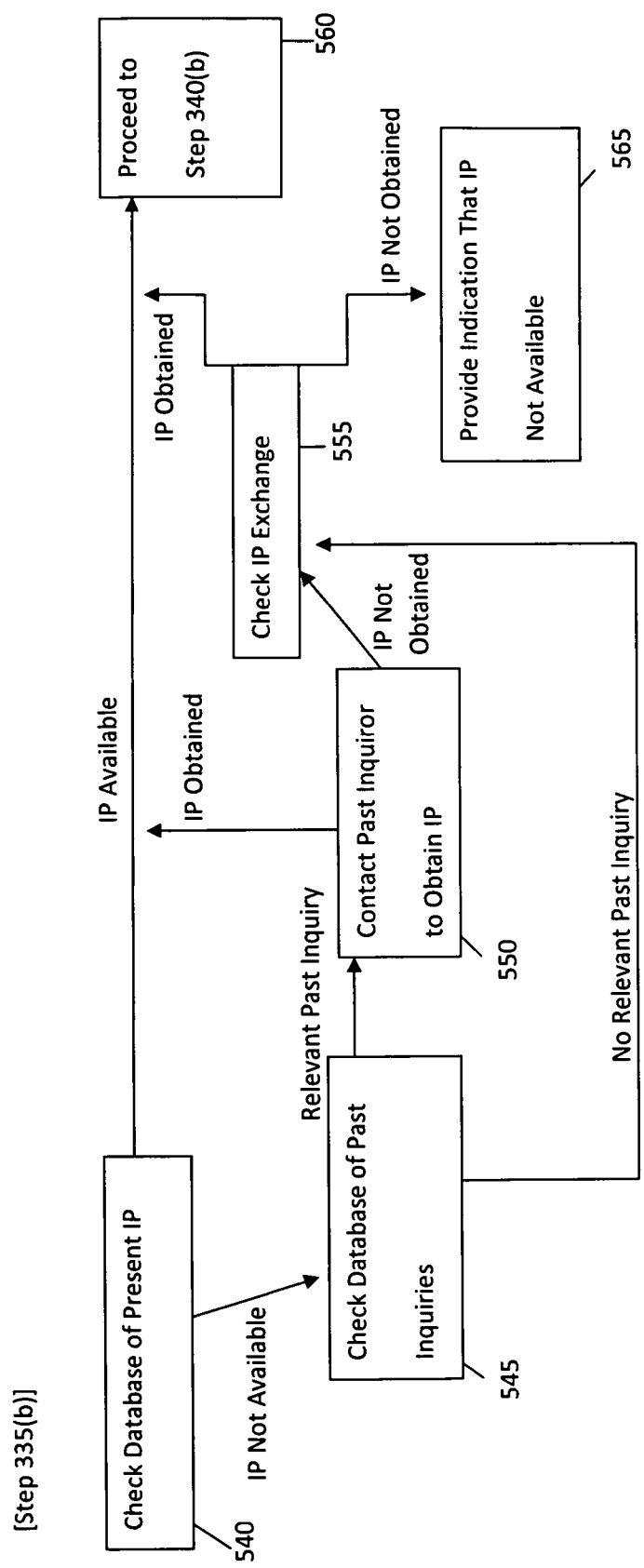
FIGS. 5(*a*)-(*c*) are flow charts showing additional exemplary steps of the IPIB system in relation to IP owners, IP desirers and IP exchanges.
Figure 6E:
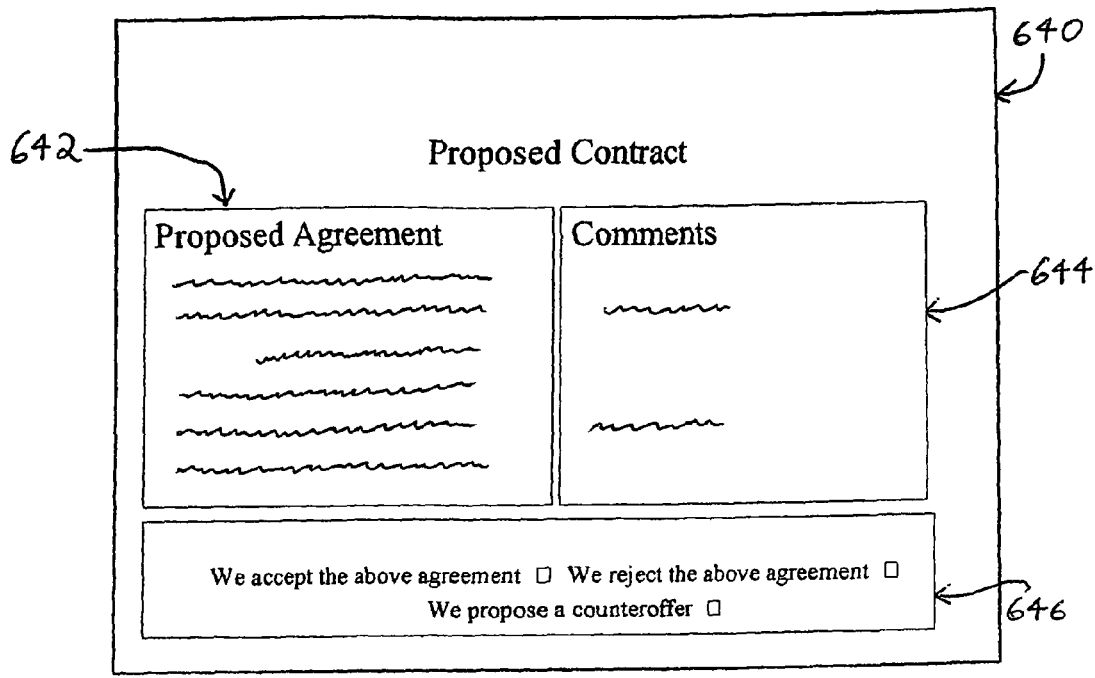
FIGS. 6(*a*)-(*f*) are schematic diagrams of exemplary web pages of a web site that can be implemented in at least one embodiment of the IPIB system.
Figure 6F:
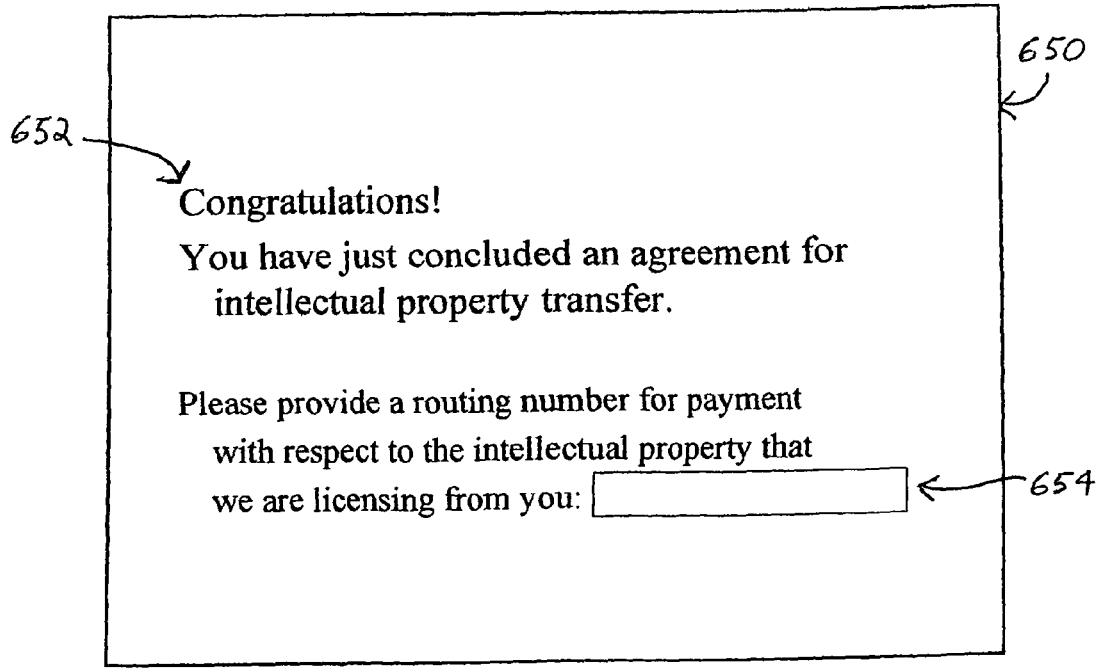

Turning to FIG. 4, a flow chart 400 is provided showing steps of operation of IPIB computer system 210 in relation to computer systems 240 of IP exchange 140. The steps shown are exemplary and are especially applicable with respect to the preferred, internet-oriented embodiment of the IPIB computer system 210 (since present-day IP exchanges are predominantly internet-based), although similar steps are readily applicable to other computer-based, or even non-computer based systems. At present, the different IP exchanges have websites that are complicated to use, and which vary substantially in their operation from website to website. Consequently, to interact with the websites of IP exchanges 140, it is necessary at present to have an employee of IPIB 110 conduct (or at least monitor) the internet-based interfacing with the websites of the IP exchanges. This is typically performed by having the employee log onto the websites via user interface 212 of IPIB computer system 210. In the future, as IP exchanges 140 become easier to use (and more standardized), IPIB computer system 210 will be able to interact with the websites of IP exchanges 140 automatically. If special software is developed, IPIB computer system 210 will not need to interface with the websites of IP exchanges 140, but rather will interface with IP exchange computer systems 240 directly.

IPIB computer system 210 typically interacts with IP exchanges 140 in an effort to find buyers or licensees (or sublicensees) for IP that was purchased or licensed by IPIB 110 from IP owners 120, or in an effort to purchase or license IP from IP owners via the IP exchanges. In order for IPIB computer system 210 to interface with a given IP exchange 140, IPIB 110 typically must have already registered as a member (e.g., must have already purchased or otherwise obtained a "seat" on the IP exchange). Assuming that IPIB 110 has registered with IP exchange 140, IPIB computer system 210 initially contacts the IP exchange computer system 240 in step 410 to begin interfacing with IP exchange 140 (typically, contact will be established by an employee of IPIB 110 by way of an internet browser operating on the IPIB computer system). Upon contacting IP exchange computer system 240, IPIB computer system 210 provides identification so that it can gain access to (e.g., login to) the IP exchange computer system, in step 415. Such identification can consist of a username and/or password (or similar identification information) provided to IPIB 110 during its registration on the IP exchange. Such initial contact or identification need not be established in certain circumstances where IPIB 110 is constantly in communication with IP exchange 140.

Upon accessing IP exchange computer system 240, IPIB computer system 210 typically has the right to post information onto the IP exchange computer system regarding IP owned, or IP rights possessed, by IPIB 110 (which is typically added to a searchable database maintained by the IP exchange). Thus, if IPIB 110 has IP that it wishes to sell or license, IPIB computer system 210 submits information to IP exchange computer system 240 in step 420(a). Also upon accessing IP exchange computer system 240, IPIB 210 typically has the right to search through information stored on the database(s) of IP exchange 140, which includes information regarding IP which is being offered, on the IP exchange, for sale or license by third parties (IP owners 120). Thus, if IPIB 110 is looking to obtain certain IP, IPIB computer system 210 obtains IP information in step 420(b). The obtaining of information by IPIB computer system 210 in step 420(b) can include three substeps. First, the IPIB computer system 210 sends search requests concerning the attributes of desired IP to IP exchange computer system 240. Next, IPIB computer system 210 receives search results from IP exchange computer system 240. Third, IPIB computer system 210 processes the search results to determine if desired IP has been found to be up for sale or license on IP exchange 140. If not, IPIB computer system 210 can return to the first substep to send new or modified search requests (or the IPIB computer system can conclude that no desired IP is available on IP exchange 140).

The information submitted by IPIB computer system 210 in step 420a typically includes descriptive information regarding the nature of the IP that IPIB 110 has available to be sold, licensed (or otherwise transferred). Likewise, the information obtained by IPIB computer system 210 in step 420b typically includes descriptive information regarding the nature of the IP that is available on IP exchange 140. As with respect to step 330 (of FIG. 3), the descriptive information can range from specific identification information (e.g., patent number or title) to more explanatory information (e.g., a summary of the technology covered by the IP). However, the submitted and obtained information can also include information regarding the particular IP rights that are or have been placed up for transfer on IP exchange 140 (as with respect to step 340 of FIG. 3). Thus, step 420(a) can be separated into two substeps concerning submissions of each of these types of information. Likewise, step 420(b) can be separated into obtaining information regarding certain IP assets that are available on IP exchange 140, and obtaining refined information regarding the actual IP rights that are available on the IP exchange. In the case where step 420(b) includes the three substeps described above, these three substeps can be iteratively performed with respect to obtaining each type of information. Alternately, searches can be performed to identify certain types of IP assets, and then the search results can be processed to eliminate (e.g., sort out) identified IP that lacks desired characteristics in terms of the actual rights that are available.

In one embodiment of the invention, IPIB computer system 210 in step 420(a) submits information to IP exchange computer system 240 that has been entered by an employee of IPIB 110 into the IPIB computer system (e.g., entering information in fields provided in the website of IP exchange 140 as viewed at user interface 212 of the IPIB computer system). In such cases, the employee has made judgments as to the most important descriptive information relating to the IP, and the most appropriate manner of providing the information to IP exchange 140. Likewise, in the case where IPIB computer system 210 is obtaining information from IP exchange computer system 240 in step 420(b), the information is typically obtained as a result of searches that are conducted by an employee of IPIB 110, who is interacting with the search interface portion of the website of IP exchange 140 as viewed at user interface 212 of IPIB computer system 110. Additionally, the employee typically analyzes (e.g., processes) the received information in step 420(b) to determine whether desired IP has been identified. However, in another embodiment of the invention, IPIB computer system 240 has sufficient information and expertise (e.g., using expert systems-type capabilities) for automatically generating appropriate submissions to, and/or for automatically obtaining information (by performing searches and processing search results) from, IP exchange computer system 140, without the direct supervision or control of an employee of IPIB 110.

After submitting information regarding IP that is available for sale or license to IP exchange computer system 240, IPIB computer system 210 eventually receives from the IP exchange computer system information regarding bids placed with respect to that IP (assuming that other parties to IP exchange 140 identify that IP as being of interest), in step 425a. Conversely, if IP listed on IP exchange 140 is identified by IPIB computer system 210 as being of interest (for purchase or license by the IPIB), the IPIB computer system can provide one or more bids for that IP to the IP exchange, in step 425b. Depending upon the operation of IP exchange 140 and the IP being transferred, bids that are received from or provided to IP exchange 140 can range in form from a full-fledged proposed agreement regarding the transfer of IP to merely a price for the IP (or a proposed royalty rate in a licensing situation). To determine an appropriate bid to be provided in step 425(b), typically an employee of IPIB 110 will determine the bid based upon the information obtained in step 420(b) and then enter the bid parameters at user interface 212 of IPIB computer system 210, which is in contact with the website of IP exchange computer system 240. In certain circumstances, determining the appropriate bid can also be a standardized task performable by IPIB computer system 210 without the direct input of an employee of IPIB 110 (e.g., if IP exchange 110 suggests a bid or provides a valuation of the IP). Insofar as some IP exchanges 140 provide suggested, standardized agreement forms for structuring the transfer of IP, the facility with which IPIB computer system 210 can automatically provide bids increases.

The bids that are either received by IPIB computer system 210 in step 425(a) or provided by IPIB computer system 210 in step 425(b) can be considered offers. Thus, upon receiving a bid in step 425(a), IPIB computer system 210 can respond to the bid by providing an acceptance to IP exchange computer program 240, in step 430. Likewise, IPIB computer system 210 in step 440 can receive an acceptance from IP exchange computer system 240 (relayed from the third party IP owner 120 of the IP subject to transfer). As with respect to the operation of IPIB computer system 210 in step 425(b), the determination of whether to accept a bid in step 430 is typically made by an employee of IPIB 110, although in some circumstances it is possible for the determinations to be automatically made by IPIB computer system 210. To the extent that bids (e.g., the agreement forms) are standardized (and simple), it becomes increasingly possible for IPIB computer system 210 to provide an immediate acceptance to the bids (e.g., offers), either by having an employee of IPIB 110 quickly scan the received bid and respond by sending an acceptance, or by having IPIB computer system 210 automatically respond to the received bid.

Upon acceptance of a bid, an agreement for IP transfer is concluded. However, initial bids often are not accepted. In the case where IPIB computer system 210 receives a bid that is determined to be unacceptable, the IPIB computer system can respond by providing objections back to IP exchange computer system 240, in step 435. Typically, an employee of IPIB 110 determines whether a bid is unacceptable and how to respond, although in some circumstances IPIB computer system 210 is able to automatically make such determinations. Likewise, if an IP owner 120 or IP desirer 130 determines that a bid provided by IPIB computer system 210 in step 425(b) is unacceptable, IPIB computer system 210 can receive objections from IP exchange computer system 240 (which originate from the IP owner or IP desirer), in step 445.

The objections provided or received in steps 435, 445 can be in the form of counteroffers or outright rejections. If the objection provided in step 435 is a counteroffer, IPIB computer system 210 can receive an acceptance in response from IP exchange computer system 240, in step 440 (assuming that IP owner 120 or IP desirer 130 finds the counteroffer to be adequate). Similarly, if the objections received by IPIB computer system 210 in step 445 form an acceptable counteroffer (to IPIB 110, as determined by an employee or, in certain situations, by the IPIB computer system automatically), the IPIB computer system can respond by providing an acceptance, in step 430. However, if the objection provided in step 435 by IPIB computer system 210 is an outright rejection or an unacceptable counteroffer, IP owner 120 or IP desirer 130 can change the bid such that the IPIB computer system receives a new bid at step 425. Likewise, if the objections received by IPIB computer system 210 are in the form of a counteroffer or an outright rejection, the IPIB computer system can respond by providing a new bid to IP exchange computer system 240 to be relayed to the third party (IP owner 120 or IP desirer 130). This new bid would again be determined either by an employee of IPIB 110 or automatically by IPIB computer system 210. It should be noted that, as with respect to step 360 of flow chart 300, it is possible that objections provided or received in response to a bid can be minor. Thus, in certain embodiments, IPIB computer system 210 is capable of providing an acceptance (e.g., in step 430) along with minor objections, and of receiving an acceptance (e.g., in step 440) along with minor objections.

If a bid is accepted in step 430 or an acceptance is received in step 440, an agreement for IP transfer over IP exchange 140 has been concluded. Thus, in the case where IPIB 110 is transferring IP to an IP desirer 130, IPIB 110 receives payment, in step 450(a). In the case where an IP owner 120 is transferring IP to IPIB 110, the IPIB must provide payment, in step 450(b). As with respect to step 370 of FIG. 3, it is not necessarily the case that payment must be made immediately upon the conclusion of an IP transfer agreement. Some IP exchanges 140, however, can have strict requirements as to payment following the concluding of agreements. This is particularly the case since many IP exchanges 140 obtain a commission or other fee upon the conclusion of such agreements. Thus, in step 450(a), IPIB computer system 210 can receive electronic payment (after providing a bank account, or routing number, to IP exchange computer system 240, or receiving a credit card number from the IP exchange computer system, etc.) or payment in some other fashion. Further, in step 450(b), IPIB computer system 210 can provide payment, which can include providing information for electronic transfer to the IP exchange computer system 240 (which can then provide the information to IP owner 120), and paying both the IP owner from whom IPIB 110 is obtaining IP and IP exchange 140.

Referring to FIG. 5, flow charts 501-503 are provided in FIGS. 5(*a*)-5(*c*), respectively. Flow charts 501-503 show additional exemplary steps of IPM computer system 210 in relation to computer systems 220, 230 and 240 of IP owners 120, IP desirers 130 and IP exchanges 140. In particular, flow charts 501-503 indicate that steps of flow charts 300, 400 of FIGS. 3-4 can be combined into a single method of operation of a IPIB computer system 210 that interacts with all of IP owners 120, IP desirers 130 and IP exchanges 140 simultaneously, in rapid succession, or in a completely automatic manner. Indeed, in a preferred embodiment of the invention, IPIB computer system 210 is capable of automatically interacting with computer systems 220, 230 and 240 of IP owners 120, IP desirers 130 and IP exchanges 140 and conducting IP transfer (including the communication of necessary information and the initiation and concluding of transactions involving the licensing, sale and purchase of IP) between IPIB 110 and each of the IP owners, IP desirers and IP exchanges.

Flow chart 501 of FIG. 5(*a*) shows several substeps that, in certain embodiments of the present invention, can be included within step 335(*a*) of FIG. 3. As discussed, step 335(*a*) concerns the processing of information from IP owner 120 regarding the nature of IP that is available for transfer. In step 510 of flow chart 501, IPIB computer system 210 checks the status of the IP that is identified in the information from IP owner 120 (e.g., possibly the validity status of a patent, the assignment status, etc.) to confirm that the IP is sound. Performing this status check can require consulting one or more database(s) or other information sources, including database(s) that are and are not part of IPIB computer system 210. Next, in step 515, a market analysis of the IP is conducted, e.g., an analysis of the markets for products that are covered by the IP. Such an analysis can require careful scrutiny of the scope of the IP, and again can require consulting multiple database(s) and also the expertise of individuals both inside and outside IPIB 110. Further, in step 520, a database within IPIB computer system 210 (e.g., part of memory 216) is checked to determine whether any IP desirers 130 have inquired, in the (recent) past, about the type of IP currently being identified by IP owner 120. All of this information can be of use to IPIB computer system 210 (and any employees of IPIB 110 who are directing the IPIB computer system) in determining the value of the IP available for transfer from IP owner 130 in step 525. If the IP is determined to have sufficient value, IPIB computer system 210 proceeds to step 340(*a*) of flow chart 300; however, if the IP is determined to have insufficient value, IPIB computer system 210 provides an indication to IP owner 120 that IPIB 110 does not (at this time) have an interested in buying or licensing this IP.

Flow chart 502 of FIG. 5(*b*) shows several substeps that, in certain embodiments of the present invention, can be included within step 335(*b*) of FIG. 3. As discussed, step 335(*b*) concerns the processing of information from IP desirer 130 regarding the nature of IP that the IP desirer wishes to obtain from IPIB 110. As shown, IPIB computer system 210 begins the processing by checking a database (e.g., within memory 216 of the IPIB computer system) of all IP held by IPIB 110 for IP that meets the specifications from IP desirer 130 (provided to the IPIB computer system in step 330(*b*)). If it is determined that IPIB 110 owns or has license rights to IP that meets the specifications of IP desirer 130, IPIB computer system 210 proceeds directly to step 560, and therefore proceeds directly to step 340(*b*) of FIG. 3 (since IPIB 110 has appropriate IP to satisfy the needs of the IP desirer). If no relevant IP is found in step 540, flow chart 502 proceeds to step 545, in which a database of IPIB computer system 210 (e.g., again typically within memory 216 of the IPIB computer system) is checked to determine if IP owners 120 have inquired about transferring to IPIB 110 the IP currently desired by IP desirer 130.

If such an inquiry was made (but IPIB 110 did not end up purchasing or licensing the IP in response to the inquiry), IPIB computer system 210 contacts IP owner 120 who had made the inquiry, in step 550. Such contact can be made by sending an email message to IP owner 120, or by way of other forms of communication (including non-electronic forms of communication). In some circumstances, IPIB 110 will (upon making contact with IP owner 120) be able to obtain the desired IP, possibly by way of the steps in flow chart 300. If the desired IP is obtained, IPIB computer system 210 proceeds also to step 560, to proceed with the sale or licensing of the newly-obtained IP to IP desirer 130 (in step 340(*b*) of FIG. 3). However, if it is determined in step 545 that an inquiry regarding the desired IP was not obtained, or if it is not possible to obtain the desired IP in step 550, then IPIB computer system 210 proceeds to step 555, in which the IPIB computer system checks with IP exchange computer system 240 to determine if the desired IP is available on IP exchange 140. To perform step 555, IPIB computer system 210 performs the steps of flow chart 400 (including step 420(*b*)). If the desired IP is then obtained by IPIB 110 via IP exchange 140, IPIB computer system 210 again proceeds to step 560, to proceed with the sale or licensing of the newly-obtained IP to IP desirer 130. However, if the desired IP is not obtained by IPIB 110 via IP exchange 140, then IPIB computer system 210 in step 565 provides an indication to IP desirer 130 that IPIB 110 does not have available the desired IP.

Flow chart 503 shows several steps that, in certain embodiments of the present invention, can follow (or be added to) the steps of flow chart 300. Once new IP is purchased or licensed by IPIB 110, information regarding the IP is stored within memory 216 of IPIB computer system 210, in step 570. The information can be generated by IPIB computer system 210, or can come from outside sources or even include the information obtained from IP owner 120, for example information obtained in step 330(*b*) of flow chart 300. (Other information can also be stored in IPIB computer system 210. For example, as IP owners 120 and IP desirers 130 contact and interact with IPIB computer system 210, information can be stored regarding the IP owners and IP desirers and their actions as well; such information can be utilized in various operations of IPIB computer system 210, such as that of step 545 of flow chart 502.) IPIB computer system 210 can utilize the information stored in step 570 in a variety of ways. For example, the information can be processed and submitted to IP exchange computer systems 240 (in step 420(*a*) of flow chart 400) as being representative of the nature of the IP of IPIB 110, in step 575. The processing of step 575 can be very minimal, e.g., merely to ensure that the information being provided to IP exchange computer system 240 conforms to the formats required by the IP exchange computer system.

Also, the information recorded in step 570 can be used for marketing purposes. For example, the information can be processed and added (at least in part) to the descriptive information provided to visitors to the website of IPIB 110 in step 315 of flow chart 300 (in step 580). Such information can also be sent to IP desirers 130, by email, other electronic communication, or otherwise. In step 585, a database (also within memory 216 of IPIB computer system 210) can be checked to identify IP desirers 130 who have already made inquiries regarding the type of IP that has just been acquired by IPIB 110. If there are such IP desirers 130, in step 590 IPIB 110 contacts them (again by email or other mode of communication), and then proceeds to work out a transfer agreement with the IP desirers assuming the IP desirers still desire the IP. Further, the recorded information can, in alternate embodiments, be accessed by IP desirers 130 themselves; in such embodiments, IPIB computer system 210 is capable of receiving search requests from the IP desirers allowing them to search for themselves the database of IP held by IPIB 110. In yet an additional embodiment, IP owners 120 are also able to access the database(s) of IPIB computer system 210 to determine whether there is a market for their IP, as indicated by the number of related inquiries from IP desirers 130 or other information. (Such embodiments in which IP owners 120 or IP desirers 130 have access to database(s) of IPIB computer system 210 are not preferred, however, since it can be advantageous to IPIB 110 to keep the exact extent of its IP as well as the identities of actual and potential customers as private as possible.)

Turning to FIGS. 6(a)-(f), exemplary web pages are shown that can be accessed and downloaded by the computer systems 220 and 230 of IP owners 120 and IP desirers 130, respectively, from the IPIB computer system 210 (and/or the web server 290) via the internet in order to facilitate the transfer of IP. Representatives of the IP owners 120 or IP desirers 130 interact with the IPIB computer system 210 by selecting items from, providing information onto, or otherwise interacting with the web pages by way of their respective computer systems 220, 230. In particularly automated embodiments, some or all of the actions taken for interacting with the web pages can be automatically performed by the computer systems 220, 230, without effort on the part of human beings. It should be understood that, in the description that follows, the interactions described are meant to include interactions performed either by human representatives of the IP owners, IP desirers, and IPIB 110 through the use of their respective computer systems 220, 230 and 210, or by the computer systems themselves operating in an automatic mode of operation.

With respect to FIG. 6(a), a first web page 600 that may be accessed by an IP owner's computer system 220 or an IP desirer's computer system 230 is accessed when the respective computer system of the IP owner or desirer first accesses the website of the IPIB computer system 210. The first web page 600 displays information 602 that identifies the IPIB 110. Further, the information 602 in some embodiments provides general information regarding the nature and purpose of the IPIB 110 (not shown). The first web page 600 further provides a new user indication item 604 at which a new user of the system (e.g., an IP owner or desirer having no previous relationship with the IPIB) can indicate that it is a new user by taking an action, such as typing an "X" into a box or merely selecting (e.g., by double-clicking with a mouse on) the indication item. The first web page 600 additionally provides a login block 606 having one or more specification items 608 in which an IP owner 120 or IP desirer 130 that has an existing relationship with the IPIB 110 can provide identification information or otherwise identify itself. In a preferred embodiment, the specification items 608 are fields at which the IP owner 120 or IP desirer 130 can input a username and a password that were previously determined during the existing relationship between the IP owner/desirer and the IPIB 110.

In the case where the IP owner 120 or IP desirer 130 is a new user and has indicated that fact by way of the new user indication item 604, a second web page 610 is accessed as shown in FIG. 6(b). The second web page 610 includes several fields 612 into which the new user can enter identifying information such as its name (or corporate name), mailing or business address, email address, telephone number, fax number, and a variety of other types of information (e.g., contact person). Depending upon the embodiment, this information will vary and the manner in which the information can be specified can also vary. For example, instead of typing various information into the fields, information can be specified by selecting options from a scroll-down menu. In addition to fields 612, the second web page 610 additionally has at least two identification items 614 at which the new user is given an opportunity to specify whether it is an IP desirer or an IP owner, that is, whether the new user wishes in particular to purchase/license IP from the IPIB 110 or to sell/license IP to the IPIB. Again, this information can be specified in any of a number of ways, including selecting the appropriate choice by way of a mouse. In certain embodiments, it is possible for a new user to specify that it is potentially both an IP desirer 130 and an IP owner 120. Once this information is specified, the new user can indicate that it has provided all the relevant information by selecting a submit information button 616, at which point the entered information is transferred via the internet to the WEB computer system 210 (or web server 290).

Once the new user has submitted all necessary identification information, the IPIB computer system 210 typically will respond by providing the new user with identification codes (e.g., username and password) for future access as an existing user. The IPIB computer system 210 can also respond with additional information regarding IP desired by the IPIB 110 or IP available from the IPIB 110, respectively, in the cases where the new user is an IP owner 120 or an IP desirer 130, or with other types of information that is pertinent to the new user. It should be noted that, with respect to FIG. 6(a), depending upon the embodiment, the identification information that is specified by an existing user in specification items 608 of the first web page 600 indicates whether the user is an IP owner 120 or an IP desirer 130. That is, in certain embodiments where the identification information provided into specification items 608 merely is indicative of a party that has an existing relationship with the IPIB 110, an intermediary web page or other selection item appears following the entry of the identification information so that the party can specify which type of transaction it is interested in concluding at this particular time. Again, upon identification by the IPIB computer system 210 of whether the user is an IP owner 120 or an IP desirer 130, special information may be sent by the IPIB computer to the respective computer system 220, 230 for display to the user.

Turning to FIG. 6(c), a third web page 620 is shown that is downloaded by the computer system 220 of an IP owner 120 once the IP owner 120 has been identified to be an IP owner to the IPIB computer system 210. This web page 620 is meant to be exemplary of the type of web page that is provided to an IP owner 120 at which the IP owner has an opportunity to identify the IP assets that it owns or has rights to and which it is interested in selling, licensing or otherwise transferring to the IPIB 110. An analogous web page (not shown) could be provided to an IP desirer 130 at which the IP desirer would have an opportunity to identify the IP assets that it desires to purchase, license or otherwise obtain from the IPIB 110. As shown in FIG. 6(c), the web page 620 includes several fields 622 at which the IP owner 120 provides information that specifies with particularity the IP assets that it has available for transfer. In the case where the IP to be transferred is understood to only include patents, the fields 622 include (as shown) fields for the entry of patent numbers, issue dates, inventors and potentially other information (e.g., filing dates) for the patents of the IP owner 120 that are available for transfer. Depending upon the nature of the patents (e.g., whether the patents are United States patents or foreign patents), the fields 622 can allow for the input of different types of information.

A second set of fields 624 is provided in which the IP owner 120 also provides general information regarding the subject matter of the IP assets for transfer. In the example shown, which is configured to receive information regarding patent assets, the fields 624 allow for input of information concerning the technological area of the patents, the products that can employ the technology in the patents, and a description of the general market for those products. Depending upon the embodiment and type of IP assets available for transfer (e.g., patents, trademarks, copyrights, trade secrets, etc.), the information obtained via fields 622 and 624 will vary in type and amount. In certain alternate embodiments, the IP owner 120 also is required to confirm that it is the sole assignee of the IP to be transferred or, if it is not the sole assignee, to provide information concerning its exact rights in the IP (e.g., to indicate that it is sole inventor of a patent available for transfer and that the patent was never assigned, or to indicate that is a joint inventor). Upon the providing of the relevant information into the fields 622 and 624, the user can submit the information so that it is transferred to the IPIB computer system 210 (or the web server 290) by selecting a submit button 626. The submission of the information entered into web page 620 corresponds to step 330(*a*) as discussed above, while the submission of the information provided into the web page 610 corresponds to step 320 as discussed above. Further, upon submission of the information by way of the submit button 626, the IPIB computer system 210 processes that information, as discussed above with respect to step 335(*a*) and FIGS. 3 and 5.

Upon completion of the processing (assuming the IP available from the IP owner 120 is still considered to be of interest to the IPIB 110), an additional fourth web page 630 appears at the computer system 220 of the IP owner 120, as shown in FIG. 6(*d*). At the fourth web page 630, the IP owner 120 can submit additional information specifying the rights or interests in the IP assets that the IP owner 120 is able or willing to transfer. As shown in FIG. 6(*d*), the fourth web page 630 includes a plurality of selection items 632 at which the IP owner 120 can specify the rights in its IP assets that it desires to transfer. For example, the IP owner 120 can specify whether the IP owner wishes to only license its IP or to sell it outright to the IPIB 110. Further for example, where the IP is to be licensed, the IP owner 120 can specify whether it wishes the license to be exclusive or non-exclusive, the time period/expiration date of the license, any territorial restrictions regarding the license, any sublicensing restrictions, and a desired royalty rate. Additionally, the IP owner 120 can specify whether the license is restricted to particular usage or product/market limitations, or whether the license (or sale) applies only to particular claims of the patent. Where the IP is to be sold outright, the IP owner 120 can specify a desired sale price. Once all of the relevant information is specified, the IP owner 120 submits the information to the IPIB computer system 210 by selecting a submit button 634. In the case where the user is an IP desirer, a web page that is analogous to the fourth web page 630 can be provided, at which the IP desirer 130 can provide information specifying the exact rights that the IP desirer is interested in obtaining in relation to IP held by the IPIB 110.

Upon submission of the information entered at the fourth web page 630, the IPIB computer system 210 obtains the information regarding the specific IP rights that are available for transfer, and then generates a proposed agreement between the IPIB 110 and the IP owner 120, in accordance with steps 340(*a*) and 345 discussed above. The IPIB computer system 110 then provides the proposed agreement, by way of the internet, for display on the computer system 220 of the IP owner 120 as a fifth web page 640. In one embodiment, as shown in FIG. 6(*e*), the fifth web page 640 displays the proposed agreement in a first region 642 and provides comment fields alongside the proposed agreement in a second region 644, into which the IP owner 120 can provide suggested amendments or other comments to the agreement. Individual comment fields of the second region 644 are preferably located alongside respective provisions of the agreement. In an alternate embodiment, the IP owner 120 can enter proposed changes immediately into the text of the agreement by way of an editing program. In such an embodiment, the second region 644 can be eliminated or, instead, provide an immediate comparison version showing new modifications to the agreement by the IP owner 120 with respect to the earlier version provided by the IPIB computer system 210.

The fifth web page 640 further includes one or more selection items 646 at which the IP owner 120 can indicate whether it accepts the agreement in its present form, whether it rejects the agreement in its present form, or whether it is proposing a counteroffer in the form of the agreement as amended by the IP owner (or an entirely new agreement that can be downloaded by the IP owner). Upon the selection of one of these items (e.g., by double-clicking on the respective item with a mouse), the information provided by the IP owner 120 via the fifth web page 640 is provided back to the IPIB computer system 210. In certain embodiments, the computer system 220 will require that the IP owner 120 confirm its selection by way of the selection items 646, in order to guarantee that the IP owner 120 has not unintentionally made a mistake in accepting or rejecting a proposed agreement, before the information is submitted to the IPIB computer system 210. Depending upon whether the IP owner 120 has indicated an acceptance, rejection or counteroffer of the proposed agreement, the response of the IPIB computer system 210 to the submission of information from the fifth web page 640 will vary. If the IP owner 120 has rejected the proposed agreement, the IPIB computer system 210 can respond with a new proposed agreement, with an indication there cannot be any agreement at this time, or with some other type of message. If the IP owner 120 has submitted a counteroffer together with an amended version of the originally-proposed agreement, the IPIB computer 210 can respond with an acceptance or with a new proposed agreement, among other responses.

Assuming that the IP owner 120 has accepted the originally-proposed agreement, a sixth web page 650 is transmitted by the IPIB computer system 210 (or the web server 290) to the computer system 220 of the IP owner, as shown in FIG. 6(*f*). The sixth web page 650 can provide a confirmation indication 652 that an agreement has been reached, and also can provide follow-up information. In the case where IP has actually been sold by the IP owner 120 to the IPIB 120, the sixth web page 650 provides a confirmation of an amount of money that has been transferred to a specified bank account of the IP owner as consideration for the transferred IP. In the case where IP is being licensed to the IPIB 120, the sixth web page 650 can include a bank account field 652 in which the IP owner 120 can specify a desired bank account number (e.g., a routing number) to which payments should be made to the IP owner 120 in accordance with the agreement. In alternate embodiments, all such payment information is set forth in the agreement when it is being determined by way of the fifth web page 640.

While only a few exemplary embodiments of this invention have been discussed above, persons skilled in the art will recognize that many changes, substitutions and modifications (including omissions) are possible in these embodiments without materially departing from the novel features and advantages of this invention. It should be clear from the above discussion that the invention can be embodied in a wide variety systems, including systems using a wide variety of computer-related technologies (including interne-related technologies) and other systems. It should be clear from the above discussion that the structure of the invention can take on a number of forms, and is not limited to the specific computer system structures shown herein as corresponding to the IPIB computer system. Any software employed in the invention can take on a variety of forms, and the website of the internet embodiment of the invention can provide and receive input information in a variety of formats (and use a variety of different screens and operate in conjunction with a variety of different data structures). The exact structure, design and operation of the invention can vary so long as the invention continues to accomplish the same functions. Indeed, the present invention is meant to include the business methods of an IP investment bank as disclosed herein, independent of any particular structure (or without any particular structure), to the extent permitted by law.

It should be clear that the invention is capable of facilitating the transfer of a variety of types of IP (including patents, as well as incipient patent rights such as patent applications, trade secrets, and other IP such as trademarks or copyrights). Further, it should be evident from the discussion that, while the steps in FIGS. 3, 4 and 5(a)-5(c) are disclosed, there are circumstances under which each or several (or even most) of the steps are not necessary for proper operation of the system. Indeed, the invention is meant to include all systems that facilitate IP transfer by way of selling, purchasing or licensing (or otherwise transferring) IP, including systems that are missing steps disclosed herein, or systems that perform the steps in a reversed or otherwise changed order. The invention is further meant to include combinations of the steps disclosed herein (or simultaneous or interrelated performance of those steps with respect to multiple parties).

Additionally, the invention is meant to include systems that perform some of the steps disclosed herein automatically (e.g., by way of a computer) and yet require the assistance or input of human beings to perform some of the other steps. The invention also envisions systems that pertain to other areas beyond that of IP transfer. For example, the invention envisions more general systems that automatically perform most (if not all) operations related to contract-formation, such as obtaining contract specifications, preferences and limitations, generating and providing proposed agreements, and evaluating, accepting, objecting to (or rejecting), and modifying such agreements, whether the agreements concern the transfer of intellectual property or other contractual arrangements (e.g., real property transactions). Accordingly, all such changes, substitutions and modifications (including omissions) are intended to be included within the scope of the invention as defined in the following claims. Other changes, substitutions, and modifications (including omissions) can be made in the design, operation (and operating conditions) and arrangement of preferred and other embodiments without departing from the spirit of the invention as expressed in the following claims.

What is claimed is:

1. A system for facilitating an overall transfer of an interest in a patent asset between a first party and a second party by way of an intermediary, the system comprising:
    a first computer system of the intermediary, the first computer system having a processor coupled to a memory, a user interface and at least one input/output device;
    wherein the first computer system provides an interface by which the first computer system conducts web-based communications with at least one additional computer system selected from a group consisting of an intellectual property (IP) owner computer system, an IP desirer computer system, an IP exchange computer system and a service firm computer system, so that the first computer system:
    (a) receives identification information from at least one of the first and second parties;
    (b) obtains first information concerning the patent asset from communication with the at least one additional computer system, wherein the first information includes descriptive information of a technical subject matter of the patent asset and market information regarding a market to which the patent asset pertains;
    (c) verifies at least one aspect of property rights of the first party in the patent asset; and
    (d) at least partly assists, based on the technical subject matter and the market information included in the first information, in negotiating conditions for at least one of a first transfer of at least some of the first party's property rights to the intermediary, wherein the at least some of the first party's property rights become property rights of the intermediary, and a second transfer of at least some of the intermediary's property rights to the second party,
    whereby the first computer system at least partly assists in achieving the overall transfer including the first and second transfer.

2. The system of claim 1, wherein the first computer system of the intermediary performs at least one evaluation pertaining to the patent asset, wherein the evaluation relates to a market for products covered by the patent asset.

3. The system of claim 2, wherein the first computer system consults information included as part of the memory of the first computer system in determining whether there has been at least one past inquiry concerning the patent asset.

4. The system of claim 1, wherein the at least one evaluation is performed based at least in part based upon the obtained first information.

5. The system of claim 1, wherein the first computer system receives the identification information from each of the first and second parties, and at least partly assists in negotiating conditions for both the first transfer and the second transfer.

6. The system of claim 1, wherein the first computer system of the intermediary makes a determination regarding whether the patent asset is owned by or licensed to the intermediary in response to an inquiry received from the second party.

7. The system of claim 6, wherein the first computer system consults a database in making the determination regarding whether the patent asset is owned by or licensed to the intermediary.

8. The system of claim 1, wherein the first computer system of the intermediary includes a web server that hosts a website of the intermediary.

9. The system of claim 8, wherein the interface provided by the first computer system includes a graphical user interface (GUI) that provides a plurality of fields by which information can be entered.

10. The system of claim 1, wherein the first computer system of the intermediary is an intellectual property investment bank (IPIB) computer system, and wherein the at least one additional computer system includes both the intellectual property (IP) owner computer system of the first party and the IP desirer computer system of the second party.

11. The system of claim 1, wherein the memory of the first computer system of the intermediary includes at least one database that is capable of storing information received from the at least one additional computer system.

12. The system of claim 11, wherein the stored information relates to inquiries of a plurality of parties that have contacted the intermediary.

13. The system of claim 1, wherein the memory of the first computer system stores information concerning at least one of a plurality of IP assets, a plurality of IP desirers, a plurality of IP owners, a plurality of exchange entities and a plurality of service firms.

14. The system of claim 1, wherein the first computer system of the intermediary is configured for communication with a further computer system of an IP exchange entity.

15. The system of claim 14, wherein the first computer system of the intermediary interacts with the further computer system of the IP exchange entity by accessing a website hosted by an IP exchange web server of the further computer system.

16. The system of claim 15, wherein the first computer system of the intermediary communicates with the further computer system using software that allows for coordination of a website of the first computer system with the website hosted by the IP exchange web server of the further computer system.

17. The system of claim 14, wherein the first computer system of the intermediary accomplishes at least one of the first and second transfer by facilitating an interaction with the further computer system of the IP exchange entity, and wherein the first computer system of the intermediary allows a user of the first computer of the intermediary to access a website of the IP exchange entity.

18. The system of claim 1, wherein at least one of the following is true:
(1) the computer system of the intermediary is capable of providing an on-line questionnaire with one or more fields for entry of the identification information;
(2) the identification information includes at least one of a username and a password; and
(3) at least one of the first and second transfer involves a license with respect to the patent asset.

19. The system of claim 1, wherein the web-based communications involves at least one of a telephone line, a cable line, an optical fiber line, a wireless communication link, and a satellite communication link, wherein the user interface includes at least one of a computer terminal with a keypad, a touch screen, and a voice-actuated input/output system, and wherein the processor is at least one of a microprocessor, a microcontroller, a personal computer, a mainframe computer, and a supercomputer.

20. The system of claim 1, wherein the first computer system of the intermediary sends at least one of an offer and an acceptance for receipt by at least one of the first and second parties.

21. The system of claim 1, wherein the web-based communications involve the obtaining of both the first information concerning the patent asset, and also second information regarding particular rights to the patent asset that either the first party desires to transfer or the second party desires to receive.

22. The system of claim 1, wherein the first computer system obtains information regarding at least one of an indication of a desired time period and desired expiration date of a licensing arrangement; an indication of a desired territorial restriction on a licensing arrangement; an indication of whether there are limitations on sublicensing of the patent asset; and indication of whether there is a use restriction in relation to licensing of the patent asset; and an indication of a royalty rate pertinent to licensing of the patent asset.

23. The system of claim 1, wherein the first information includes at least one of a title, a number identifying the patent asset, a filing date, an issue date, and expiration information of the patent asset.

24. The system of claim 1, wherein the first information includes product information regarding a product that is within a scope of the patent asset.

25. The system of claim 1, wherein the first computer system of the intermediary performs at least one evaluation pertaining to the patent asset relating to a financial value of the patent asset.

26. The system of claim 1, wherein the first computer system of the intermediary performs at least one evaluation pertaining to the patent asset relating to a technological scope of the patent asset or a product coverage of the patent asset.

27. The system of claim 1, wherein the first computer system of the intermediary performs at least one evaluation pertaining to the patent asset relating to a product coverage of the patent asset.

28. The system of claim 1, wherein the first computer system of the intermediary performs at least one evaluation pertaining to the patent asset relating to whether there has been at least one past inquiry concerning the patent asset.

* * * * *